(12) United States Patent
Donderici et al.

(10) Patent No.: US 9,360,583 B2
(45) Date of Patent: Jun. 7, 2016

(54) APPARATUS AND METHODS OF LOCATING DOWNHOLE ANOMALIES

(75) Inventors: Burkay Donderici, Houston, TX (US); Michael S. Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 837 days.

(21) Appl. No.: 13/393,789

(22) PCT Filed: Oct. 1, 2009

(86) PCT No.: PCT/US2009/059286
§ 371 (c)(1),
(2), (4) Date: May 21, 2012

(87) PCT Pub. No.: WO2011/040926
PCT Pub. Date: Apr. 7, 2011

(65) Prior Publication Data
US 2012/0234605 A1    Sep. 20, 2012

(51) Int. Cl.
| | |
|---|---|
| *E21B 47/022* | (2012.01) |
| *G01V 3/30* | (2006.01) |
| *E21B 47/16* | (2006.01) |
| *G01V 1/46* | (2006.01) |

(52) U.S. Cl.
CPC ............ *G01V 3/30* (2013.01); *E21B 47/02208* (2013.01); *E21B 47/16* (2013.01); *G01V 1/46* (2013.01)

(58) Field of Classification Search
CPC ..... E21B 47/02; E21B 47/208; E21B 47/091; E21B 47/101; E21B 47/14; E21B 47/02208; E21B 10/22; E21B 10/25

USPC ........ 166/177.1, 255.1, 254.1, 254.2; 175/50; 342/83, 84; 340/552, 554
See application file for complete search history.

(56) References Cited

U.S. PATENT DOCUMENTS

| | | | |
|---|---|---|---|
| 4,578,675 | A | 3/1986 | MacLeod |
| 4,754,641 | A | 7/1988 | Orban et al. |
| 4,905,203 | A | 2/1990 | Sims et al. |
| 4,947,683 | A | 8/1990 | Minear et al. |

(Continued)

FOREIGN PATENT DOCUMENTS

| | | |
|---|---|---|
| AU | 2009353327 B2 | 3/2014 |
| EP | 0310253 | 4/1989 |

(Continued)

OTHER PUBLICATIONS

"United Kingdom Application Serial No. 1204620.7, Response filed May 27, 2014 to Office Action mailed Apr. 14, 2014", 17 pgs.

(Continued)

*Primary Examiner* — Jennifer H Gay
*Assistant Examiner* — David Carroll
(74) *Attorney, Agent, or Firm* — Schwegman Lundberg & Woessner, P.A.; Benjamin Fite

(57) ABSTRACT

Apparatus and methods are implemented to determine characteristics of geological formations in a well. One or more transmitters and receivers electrically imitate a moving antenna. The moving antenna produces a distribution of frequencies by utilizing the Doppler effect. Each anomaly in the well produces reflections with different frequency, amplitude and phase information. Location and characteristics of multiple anomalies can be identified simultaneously in a well.

20 Claims, 35 Drawing Sheets

(56) References Cited

U.S. PATENT DOCUMENTS

| | | | |
|---|---|---|---|
| 6,771,563 | B1 | 8/2004 | Bernard et al. |
| 6,829,947 | B2 | 12/2004 | Han et al. |
| 6,914,433 | B2 * | 7/2005 | Wright et al. ................. 324/336 |
| 6,938,458 | B2 | 9/2005 | Han et al. |
| 7,150,188 | B2 * | 12/2006 | Charara et al. ............. 73/152.05 |
| 7,357,180 | B2 * | 4/2008 | Vinegar et al. ............. 166/254.1 |
| 2005/0034530 | A1 | 2/2005 | Han et al. |
| 2007/0239403 | A1 * | 10/2007 | Hornbostel ................... 702/191 |
| 2008/0062036 | A1 * | 3/2008 | Funk et al. ...................... 342/22 |
| 2008/0128166 | A1 * | 6/2008 | Forgang et al. ................. 175/50 |
| 2009/0009382 | A1 * | 1/2009 | Ruffa ............................ 342/113 |
| 2009/0015260 | A1 * | 1/2009 | Bittar et al. ................... 324/333 |

FOREIGN PATENT DOCUMENTS

| | | |
|---|---|---|
| EP | 0310253 A2 | 4/1989 |
| GB | 2292460 A | 2/1996 |
| WO | WO-2008107768 A2 | 9/2008 |
| WO | WO-2008118981 A2 | 10/2008 |
| WO | WO-2011040926 A1 | 4/2011 |

OTHER PUBLICATIONS

"Australian Application Serial No. 2009353327, Examination Report mailed Nov. 2, 2012", 4 pgs.

"Australian Application Serial No. 2009353327, Response filed Oct. 21, 2013 to Examination Report mailed Nov. 2, 2012", 24 pgs.

"International Serial No. PCT/US2009/059286, International Preliminary Report on Patentability mailed Apr. 12, 2012", 5 pgs.

"United Kingdom Application Serial No. 1204620.7, Response filed Apr. 4, 2014 to Office Action mailed Feb. 5, 2014", 51 pgs.

"International Application Serial No. PCT/US2009/059286, Search Report mailed Sep. 6, 2010", 7 Pgs.

"International Application Serial No. PCT/US2009/059286, Written Opinion mailedSep. 6, 2010", 6 Pgs.

"Australian Application Serial No. 2009353327, Notice of Acceptance mailed Nov. 29, 2013", 2 pgs.

"United Kingdom Application Serial No. 1204620.7, Office Action mailed Feb. 5, 2014", 2 pgs.

"United Kingdom Application Serial No. 1204620.7, Office Action mailed Apr. 14, 2014", 2 pgs.

* cited by examiner

APPARATUS AND METHODS OF LOCATING DOWNHOLE ANOMALIES

RELATED APPLICATIONS

This application is a U.S. National Stage Filing under 35 U.S.C. 371 from International Application No. PCT/US2009/059286, filed on Oct. 1, 2009, and published as WO 2011/040926 A1 on Apr. 7, 2011; which application and publication are incorporated herein by reference in their entirety.

TECHNICAL FIELD

The present invention relates generally to systems capable of making measurements in a well.

BACKGROUND

In drilling wells for oil and gas exploration, understanding the structure and properties of the geological formation surrounding a borehole provides information to aid such exploration. However, the environment in which the drilling tools operate is at significant distances below the surface and measurements to manage operation of such equipment are made at these locations. Further, the usefulness of such measurements may be related to the precision or quality of the information derived from such measurements. Typical downhole tools that operate at low frequencies measure shallow and deep features in a mixed form. This type of measurement translates to low resolution and difficulties in converting the raw data to useful parameters, when reading deep formations.

BRIEF DESCRIPTION OF THE DRAWINGS

Embodiments of the invention are illustrated by way of example and not limitation in the figures of the accompanying drawings in which.

DETAILED DESCRIPTION

The following detailed description refers to the accompanying drawings that show, by way of illustration, various embodiments of the invention. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
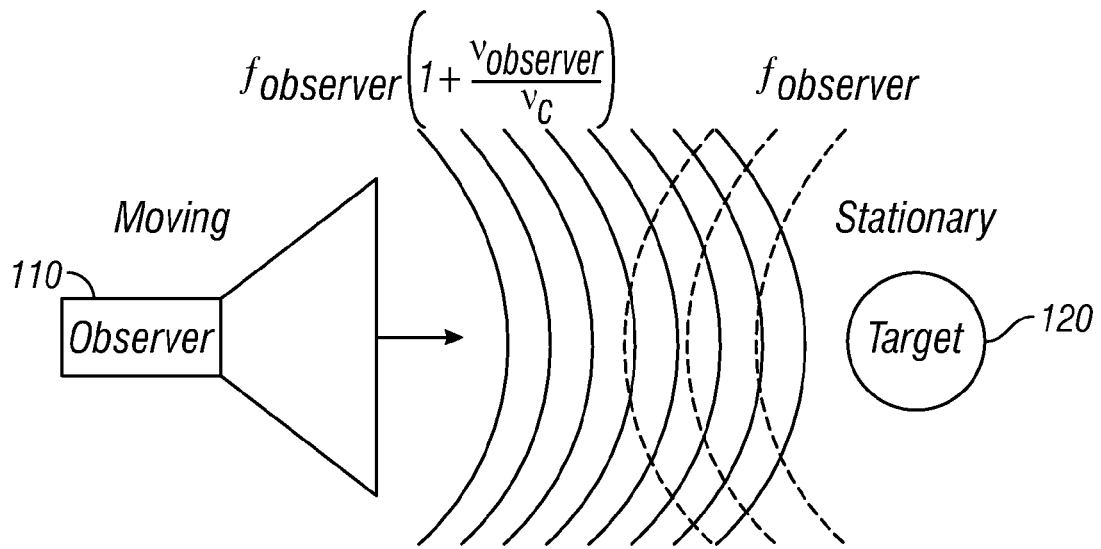
FIG. 1 depicts an embodiment of a method of locating downhole anomalies in a well using the Doppler effect.

FIG. 1 depicts an embodiment of a method of locating downhole anomalies in a well. Pulses can be synthesized to electrically imitate (mimic) a single moving transmitter 110 utilizing a transmitter screen. Due to a relativity principle and despite the fact that the target 120 is stationary, a distinct Doppler shift is produced at each target in the media. Using the Doppler shift, stationary anomalies in homogeneous media can be located as targets. Such anomalies include, but are not limited to, hydrocarbon sources, water sources, dipping bed boundaries, salt domes, etc. The transmitter screen of the tool can include coil, wire, toroidal, or button antennas. A tool that electrically mimics a single moving transmitter can be operated to utilize the Doppler phenomenon to perform accurate localization of multiple targets at low frequencies. In various embodiments, a Doppler based tool can operate at low frequencies ranging from 50 Hz to 100 KHz. The Doppler based tool can also operate at frequencies greater than 100 KHz. This overcomes low resolution and difficulties in inversion when reading deep formations associated with conventional downhole tools that measure shallow and deep features in a mixed form when operating at low frequencies.

Conventional tools for determining anomalies downhole in a well include resistivity tools. In various embodiments, a tool that electrically imitates a single moving transmitter to locate downhole anomalies in a well using the Doppler effect can provide enhanced operation over conventional tools. A moving antenna velocity can be chosen such that a small number of wave periods are observed in the received signal. This number range can be from 1 to 100. Other number ranges may be used. Doppler effect based tools may provide deep accurate localization of anomalies such as formation boundaries at low frequencies, simultaneous localization of multiple anomalies, accurate and deep measurements along tool axis, background resistivity measurement, and enhanced tool steering due to deep and highly detailed evaluation of formations. Conventional tools based on Doppler Effect for use in the environment above ground take advantage of movement of the fluids within their environment. Since moving targets produce frequencies that are different than the source frequency, such tools allow a natural focusing mechanism to monitoring moving anomalies in the environment above ground and also can eliminate direct signal interference.

Figure 2:
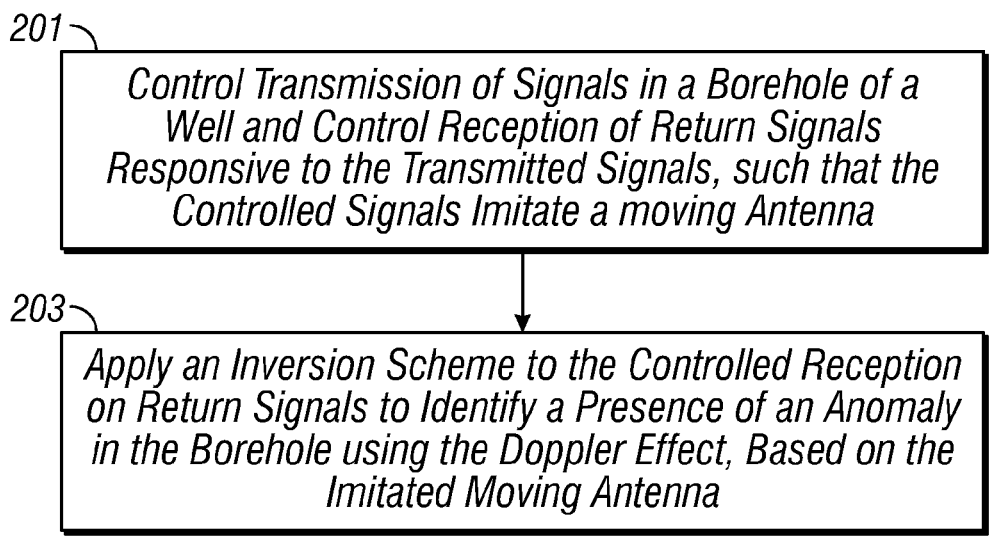
FIG. 2 illustrates an embodiment of a method of locating downhole anomalies using the Doppler effect.

FIG. 2 illustrates an embodiment of a method of locating downhole anomalies using the Doppler effect. At 201, transmission of signals downhole in a well is controlled and reception of return signals responsive to the transmitted signals is controlled, such that the controlled signals imitate a moving antenna. At 203, an inversion scheme is applied to the controlled reception of return signals to identify a presence of an anomaly using the Doppler effect, based on the imitated moving antenna. Control of the transmission of the signals can be realized by applying pulses to different transmitter antennas in an array of transmitter antennas such that the initiation of each pulse to the different transmitter antennas is conducted at different times. Control of the reception of return signals can include a time-based sequencing of the collection of the return signals. Although operating frequency of the example tool is in a range from 50 hertz to 100 kilohertz, higher frequencies can also be used.

Determining the presence of an underground anomaly can be used to affect drilling operations. A method that imitates a moving antenna to make use of the Doppler effect can be used in determining an anomaly as a hydrocarbon source. It can also be used in determining an anomaly as a water source. With a hydrocarbon source being more resistive than a water source, the return signals from a hydrocarbon source and from a water source will be influenced by these differences. In various embodiments, applying an inversion scheme can be applied to determine a location of the anomaly. The determination of the presence of a hydrocarbon source can be used to steer a drilling operation towards the hydrocarbon source, while the presence of a water source can be used to steer a drilling operation away from the water source.

In various embodiments, imitating (mimicking) a moving antenna can include generating a drive signal to each transmitter antenna of an array of N transmitter antennas, N being a positive integer, to transmit the signals downhole in a well. Each drive signal can have two components correlated to an associated transmitter antenna: a transmission time-based weight signal and a waveform signal. Each drive signal can be realized as the product of the waveform signal and the transmission time-based weight signal associated with the respective drive signal. In addition, imitating a moving antenna can include applying a reception time-based weight signal to each return signal at each receiver antenna of an array of M receiver antennas, M being a positive integer. Each reception time-based weight signal can be correlated to an associated receiver antenna. A sum of the product of each reception time-based weight signal with its associated return signal can be used as a received time signal associated with the moving antenna. The number of receiver antennas, M, can equal the number of transmitter antennas, N. In an embodiment, N>5. The number of transmitter antennas and receivers can vary from one to a number significantly greater than 5.

In various embodiments, a process of locating an anomaly using the Doppler effect relative at an imitated moving antenna using an array of transmitter antennas and an array of receiver antennas can include exciting at most two transmitter antennas to radiate during a common time interval. To increase accuracy, more than two transmitter antennas can be excited to radiate during a common time interval.

In various embodiments, a process of locating an anomaly using the Doppler effect relative at an imitated moving antenna can include forming a received time signal based on the return signals, after applying reception time-based weight signals to the return signals. This received time signal can be associated with the imitated moving antenna. The received time signal can be passed though a time gate that selects portions of the received time signal with initial transients effectively removed. The portions of the received time signal can be separated into decaying components or growing components such that one or more frequencies and/or one or more phase values are output. A different anomaly associated with each of the one or more frequencies and/or one or more phase values can be identified.

A frequency inversion to the one or more frequencies can be applied to identify each different anomaly associated with each of the one or more frequencies. A location of each anomaly associated with each of the one or more frequencies can be identified. The location can be identified by elevation and/or distance. The frequency inversion can be applied using a frequency map based on an excitation scheme of the transmitter antennas.

A phase inversion to the one or more phases can be applied to identify each different anomaly associated with each of the one or more phases. A location of each anomaly associated with each of the one or more phases. The location can be identified by distance. The phase inversion can be applied using resistivity data derived from a resistivity inversion applied to a Fourier transform of the received time signal. The resistivity inversion can be conducted using a library of responses.

Figure 3:
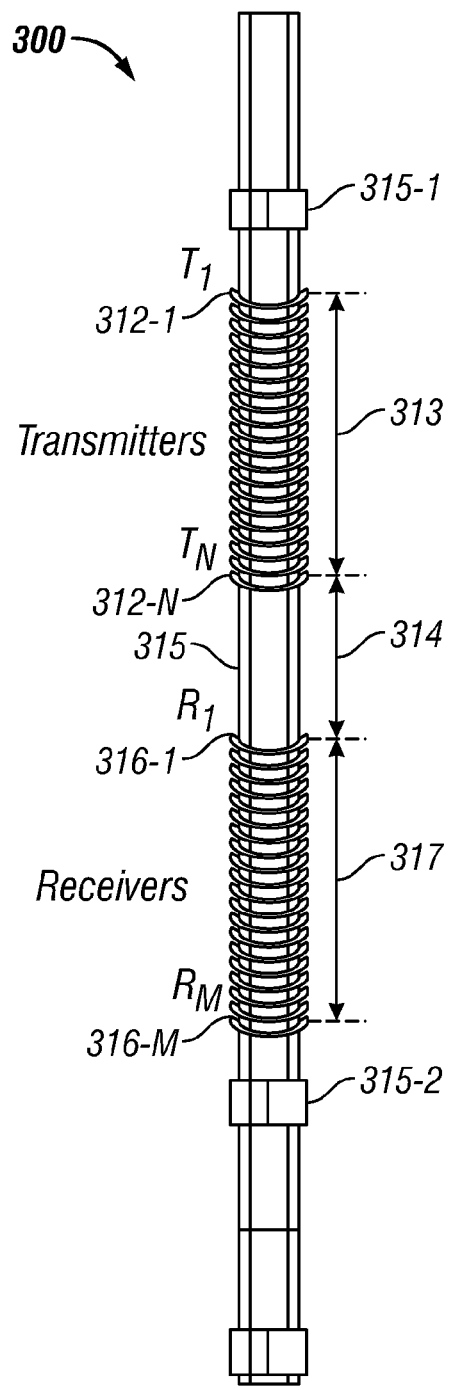
FIG. 3 shows an embodiment for a tool for locating downhole anomalies using the Doppler effect.

FIG. 3 shows an embodiment for a tool 300 for locating downhole anomalies using the Doppler effect. Tool 300 includes a plurality of transmitter antennas 312-1 . . . 312-N and a plurality of receiver antennas 316-1 . . . 316-M. The plurality of transmitter antennas 312-1 . . . 312-N can be disposed above the plurality of receiver antennas 316-1 . . . 316-M. The plurality of transmitter antennas 312-1 . . . 312-N can be ultra-wide-band antennas. The plurality of receiver antennas 316-1 . . . 316-M can be ultra-wide-band antennas. The number of antenna elements in the transmitter array and the receiver array can be the same. A relatively large number of antenna elements ($T_N, R_N > 5$) can be used in each array.

The plurality of transmitter antennas 312-1 . . . 312-N can be separated from the plurality of receiver antennas 316-1 . . . 316-M by a distance 314. In an example embodiment, distance 314 can equal 144 inches. Other lengths can be used for separation distance 314. The plurality of transmitter antennas 312-1 . . . 312-N extend over a distance 313 and the plurality of receiver antennas 316-1 . . . 316-M extend over a distance 317. The length of distance 313 can be equal to the length of distance 317. In an example embodiment, extension distances 313 and 317 can equal 160 inches. Other lengths can be used for extension distances 313 and 317.

Tool 300 can be disposed on a single piece of collar 315 having ends 315-1 and 315-2. The plurality of transmitter antennas 312-1 . . . 312-N and the plurality of receiver antennas 316-1 . . . 316-M of tool 300 can be distributed into more than one collar by utilizing a short-hop communication system among the collars.

Figure 4:
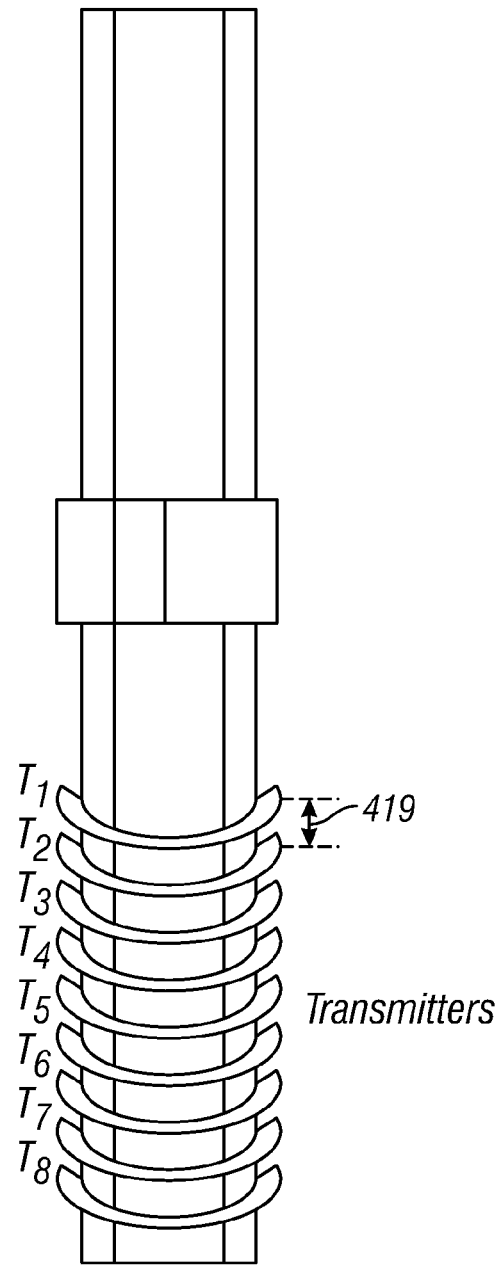
FIG. 4 shows a portion of an embodiment of a transmitter array with the antenna elements having a uniform spatial separation distance.

FIG. 4 shows a portion of an embodiment of a transmitter array with the antenna elements having a uniform spatial separation distance 419. In an example embodiment, a uniform spatial sampling with element separation 419, Δ=8", can be used. Other lengths, Δ, can be used for element separation length 419. In various embodiments, non-uniform distances can be used in between antenna elements.

Figure 5:
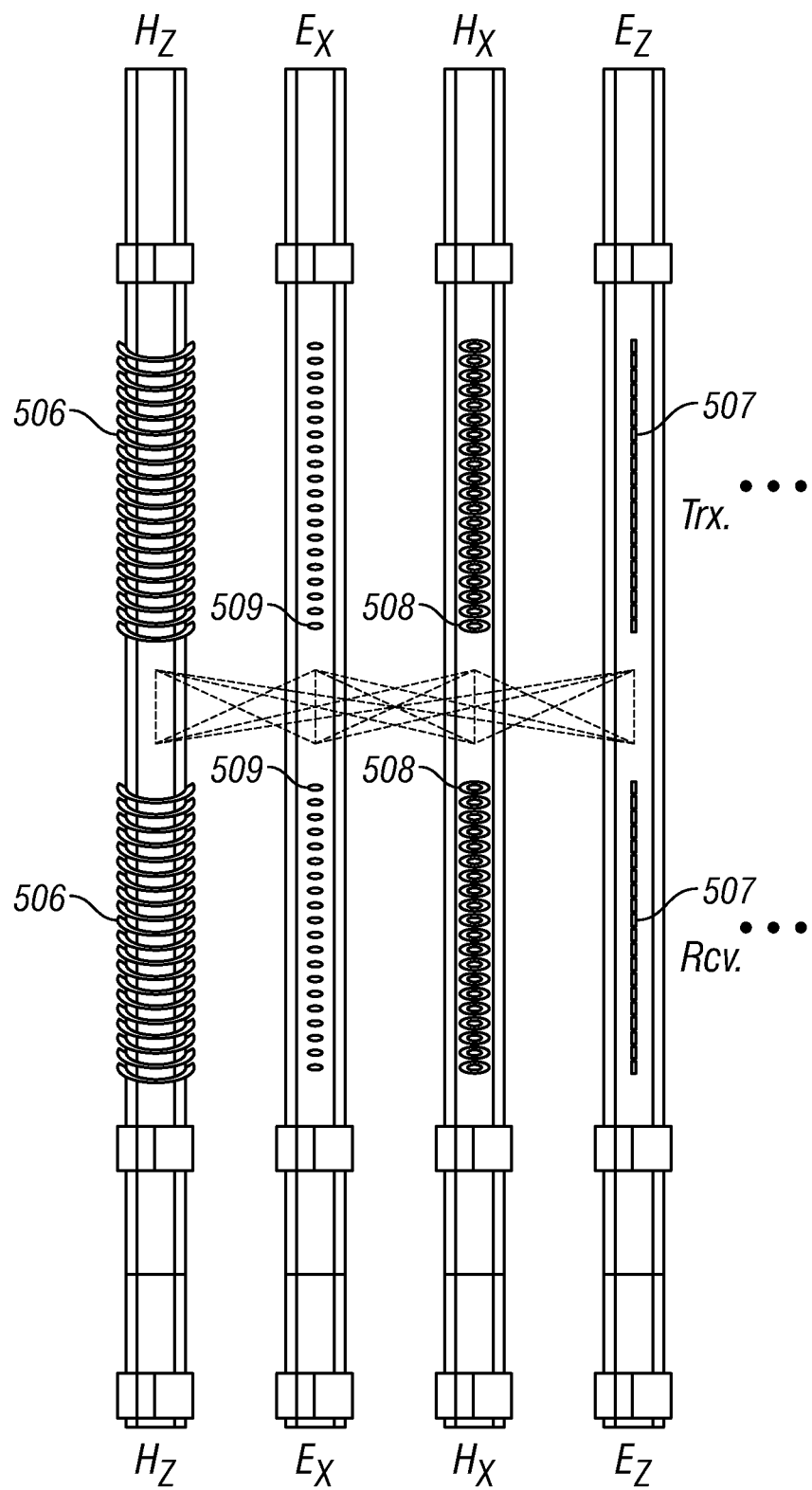
FIG. 5 shows embodiments of alternative antenna elements that can be used on the tool of FIG. 3.

FIG. 5 shows embodiments of alternative antenna elements that can be used on tool 300 of FIG. 3. Configuration of antenna elements can be based on dipole antenna approximations. Realizations for dipole antennas can include, but are not limited to, coils 506 for magnetic, H, dipoles, and wires 507, toroids 508, and buttons 509 for electric, E, dipoles. Antenna elements for the array of transmitter antennas can have a configuration different from the antenna elements for the array of receiver antennas. This arrangement of different configurations on a tool is represented by the dashed lines in FIG. 5. Various combinations of the configurations shown in FIG. 5 are useful to produce lateral sensitivity, which may not be achieved by tool 300 of FIG. 3 in which only coils are used for both the transmitter array and the receiver array. Various combinations of the configurations can allow improved penetration properties in the presence of highly resistive mud or direct field filtering effects.

Figure 6:
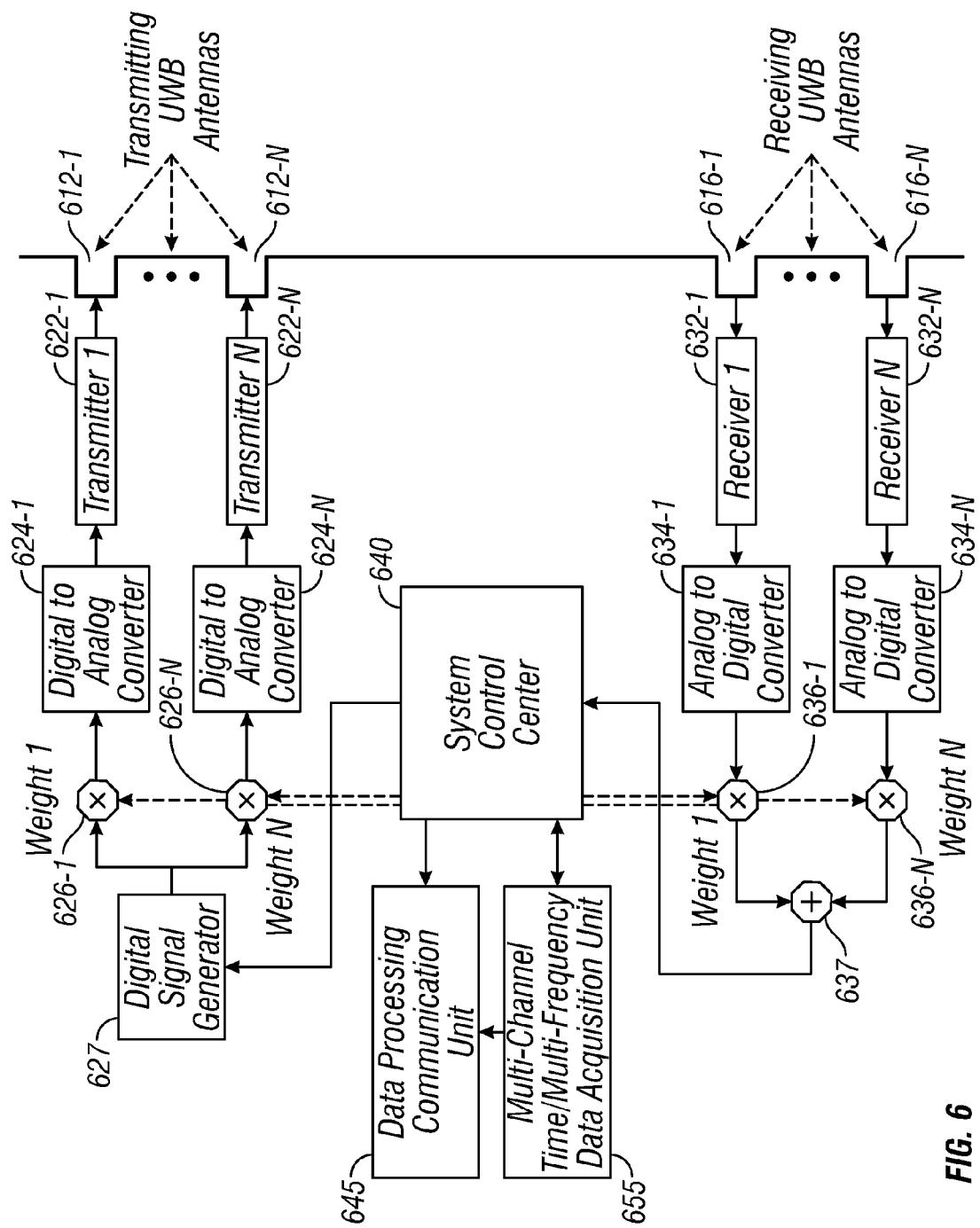
FIG. 6 shows an embodiment of a multiple-antenna data acquisition scheme.

FIG. 6 shows an embodiment of a multiple-antenna data acquisition scheme. The antenna configurations shown in FIGS. 3-5 can be used in the shown data acquisition scheme. In an embodiment, to collect voltage data at receiver antennas 616-1 . . . 616-N, transmitter antennas 612-1 . . . 612-N can be turned on simultaneously by a system control center 640 by activating a digital signal generator unit 627. The level and shape of a signal at each transmitter antenna 612-1 . . . 612-N can be determined by system control center 640 via a weighting process.

System control center 640 can send transmission time-based weight signals to a transmission combining circuit coupled to digital signal generator 627. The transmission combining circuit can have one or more input nodes to receive N transmission time-based weight signals and one or more output nodes to output N adjusted transmission signals. Each of the N adjusted transmission signals can be generated from combiners 626-1 . . . 626-N that produce a product of the waveform from digital signal generator 627 and a different one of the transmission time-based weight signals. Each processed digital signal can be converted to an analog signal using a corresponding digital-to-analog converters 624-1 . . . 624-N. Digital-to-analog converters 624-1 . . . 624-N can be realized as a single unit or as a single digital-to-analog converter with appropriate multiplexing. The output from digital-to-analog converters 624-1 . . . 624-N can be fed to transmitter antennas 612-1 . . . 612-N through associated transmitter circuits 622-1 . . . 622-N.

A linear approximation for the synthesized antenna motion can be achieved by having at most two antennas radiate at the same time. Each transmitter antenna 612-1 . . . 612-N of an antenna array can be identified by an index. The two transmitter antennas can be activated to radiate at the same time by activating antennas using consecutive indices. A higher order of interpolation can be used to enhance accuracy, which can be attained with a higher number of antenna excitations at the same time. Digital signal generator 627 can operate in the 100 Hz-1 MHz frequency range and can be used to drive transmitter antennas 612-1 . . . 612-N through associated transmitter circuits 622-1 . . . 622-N. In various embodiments, transmitter antennas 612-1 . . . 612-N are driven by pulses that can be ultra-wide-band signals. Alternatively, narrower frequency bands can also be utilized by using an appropriate low-pass version of the signal at digital signal generator 627.

A symmetrical methodology can be used for the receiving part of data acquisition system 600. The received voltage levels collected at receiver circuits 632-1 . . . 632-N, from associated receiver antennas 616-1 . . . 616-N, can be converted to digital signals using analog-to-digital converters 634-1 . . . 634-N and passed through a weighting procedure. Analog-to-digital converters 634-1 . . . 634-N can be realized as a single unit or as a single analog-to-digital converter with appropriate multiplexing. The output from analog-to-digital converters 634-1 . . . 634-N can be fed to a transmission combining circuit coupled to a summer 627.

System control center 640 can be operable to send reception time-based weight signals to the reception combining circuit. The reception combining circuit can have one or more input nodes to receive N reception time-based weight signals and one or more output nodes to output N adjusted received signals. Each of the N adjusted received signals can be generated from combiners 636-1 . . . 636-N that produce a product of an output one of analog-to-digital converters 634-1 . . . 634-N and a different one of the reception time-based weight signals. Output from summer 637 can provide a received time signal for the imitated moving antenna.

In an embodiment, a linear approximation for receiver antenna motion can be achieved by utilizing at most two antennas simultaneously. Time-domain data obtained at receiver antennas 616-1 . . . 616-N for each transmitter antenna 612-1 . . . 612-N can be sent to the surface via the telemetry system for further processing and monitoring. Various processing and monitoring functions can be conducted using data processing communication unit 645 and multi-channel time\multi-frequency data acquisition unit 655. Digital signal generator unit 627, combiners 626-1 . . . 626-N, digital-to-analog converters 624-1 . . . 624-N, transmitter circuits 622-1 . . . 622-N, receiver circuits 632-1 . . . 632-N, analog-to-digital converters 634-1 . . . 634-N, combiners 636-1 . . . 636-N, and summer 627 can be located in a housing on a collar of a drill string. With receiver antennas 616-1 . . . 616-N and transmitter antennas 612-1 . . . 612-N distributed on different collars, the electronics associated with the transmitter array can be housed in one collar and the electronics associated with the receiver array can be housed in another collar.

Figure 7:
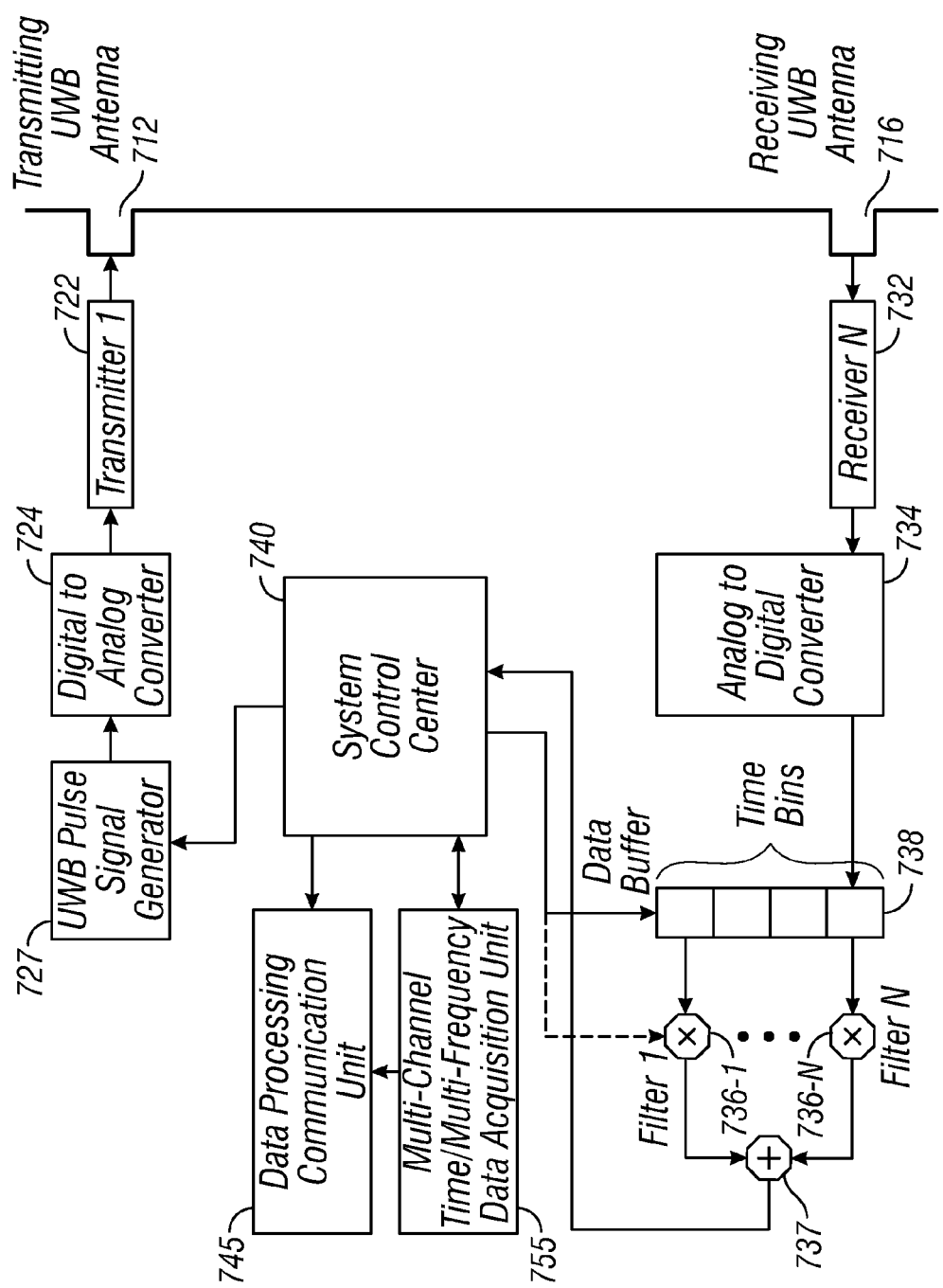
FIG. 7 shows an embodiment of a single-antenna data acquisition scheme.

FIG. 7 shows the single-antenna data acquisition scheme, where a single transmitting antenna 712 and a single receiving antenna 716 are used instead of the arrays shown in FIG. 6. System control center 740 can send a control signal to pulse signal generator 727, whose output can be passed through digital to analog converter 724. The output of digital to analog converter can be input to transmitter circuit 722 to drive transmitting antenna 712.

In the single-antenna case, multiple antenna measurements with impulse excitation (or ultra-wide-band) can be taken at different times as drilling takes place. Measurements can be conducted on signals provided by receiver circuit 732 that receives signals from receiving antenna 716. Output from receiver circuit 732 can be operated on by analog to digital converter 734 for storage in data buffer 738. A time signature associated with each measurement can be stored in time bins of a data buffer 738.

A filtering procedure can be applied to the collection of received data in data buffer 738, which is equivalent to the data that would be received with the multiple-antenna setup with pulse excitations in FIG. 6, up to measurement errors. Filters 736-1 . . . 736-N are operable to receive weighted signals and apply the weighted signals to associated data from time bins of data buffer 738. The timing of data acquisition for each bin can be determined by system control center 740. The timing of data acquisition can be structured to seek a predetermined spatial separation in between acquisitions. The spatial separation can be supplied by an external tool or from the surface via a telemetry system. By inclusion of a secondary transmitter above or below the existing transmitter, by similar inclusion of a secondary receiver for the existing receiver, and by correlation of measurements stored in a separate time bin, it is also possible to obtain regular spatial intervals without the support of an external tool. In the single-antenna acquisition scheme, it is also possible to adapt the spatial sampling interval to a background resistivity value or to different problems that involves with lower frequencies and larger scales, such as a cross-well survey application.

Outputs from filters 736-1 . . . 736-N can be provided to summer 737. Output from summer 737 can provide a received time signal for the imitated moving antenna. Various processing and monitoring functions can be conducted using data processing communication unit 745 and multi-channel time\multi-frequency data acquisition unit 755. Pulse signal generator 727, digital to analog converter 724, transmitter circuit 722, receiver circuit 732, analog to digital converter 734, data buffer 738, filters 736-1 . . . 736-N, and summer 737 can be located in a housing on a collar of a drill string. With receiver antenna 716 and transmitter antenna 712 distributed on different collars, the electronics associated with the transmitter array can be housed in one collar and the electronics associated with the receiver array can be housed in another collar.

Figure 8:
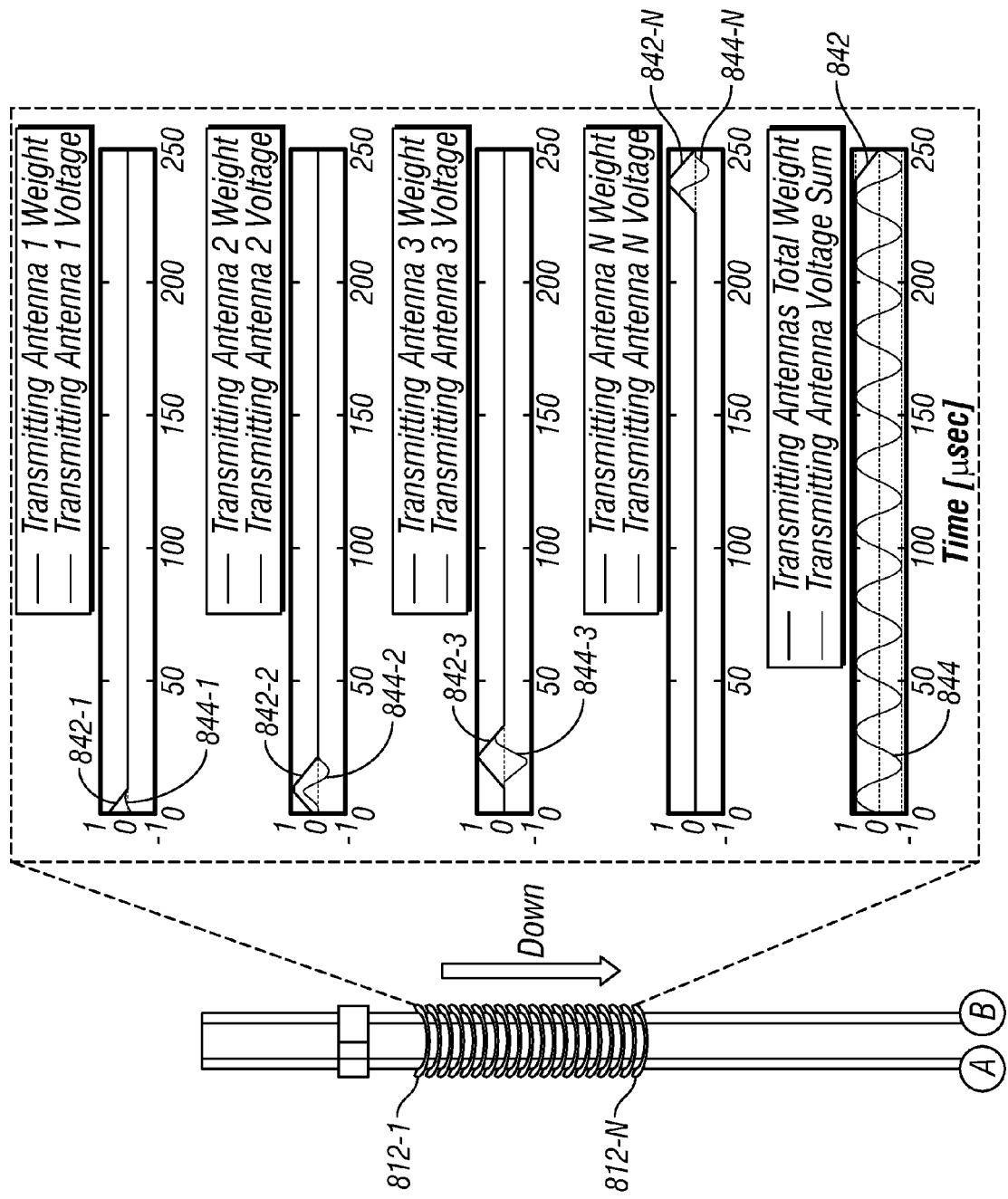
FIG. 8 shows an embodiment of a method in which antenna pulses are generated to imitate a moving transmitter and receiver having the same directionality.
Figure 8:
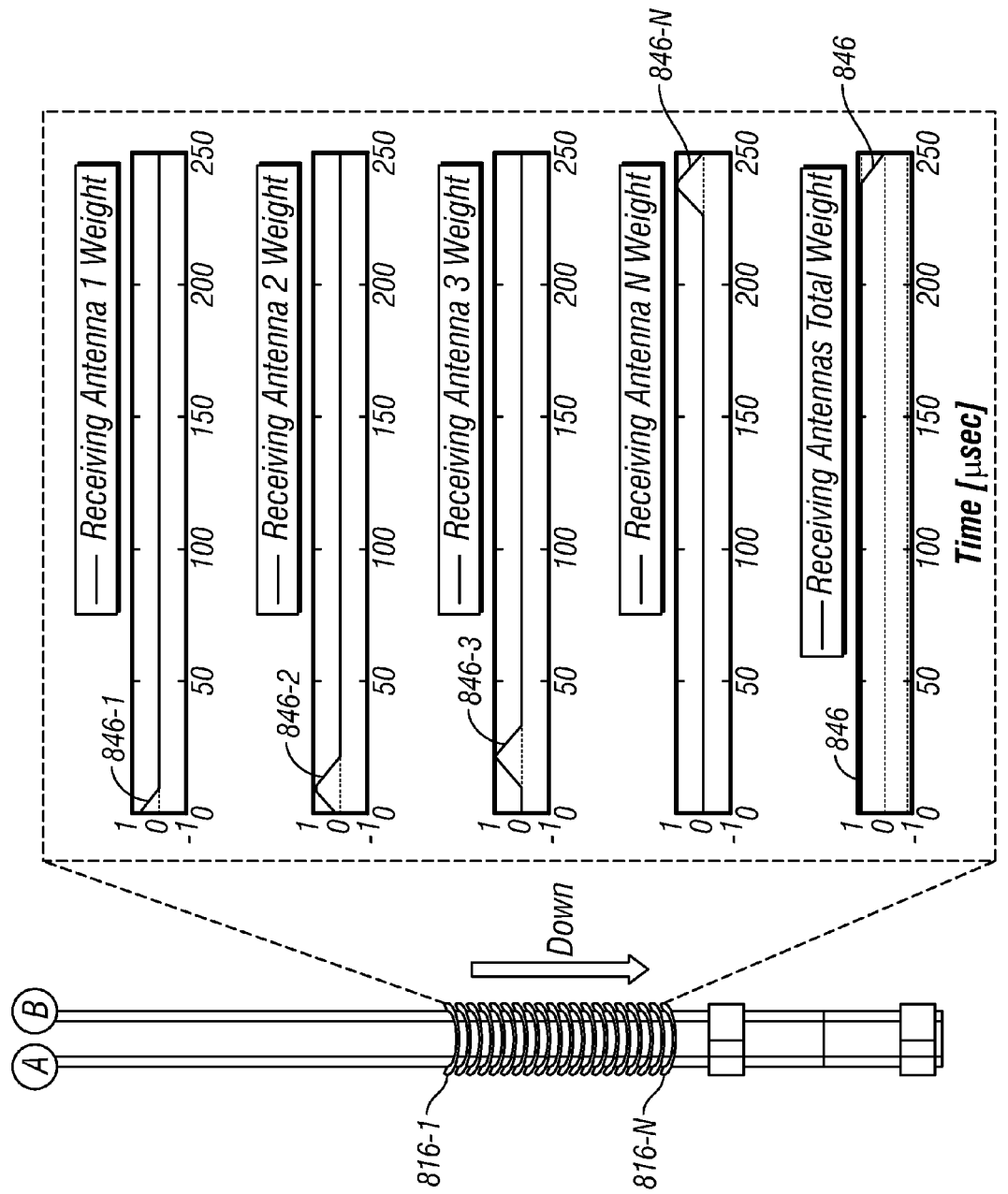

FIG. 8 shows an embodiment of a method in which antenna pulses are generated to imitate a moving transmitter and receiver having the same directionality. The signal movement in both the transmitter array and the receiver array starts from the highest antenna elements, 812-1 and 816-1, and proceeds towards the lowest elements, 812-N and 816-N. In such a case, effective (synthetic) transmitter location and effective (synthetic) receiver location show a parallel motion, where the distance between the locations is kept constant. The effective velocity of the mimicked moving antenna can be derived as the distance between two adjacent antennas divided by the time to switch from one antenna to the next antenna. The time to switch can be taken as the time difference between two peaks of the weighting function as shown in FIG. 8, such as between 842-2 and 842-2. In FIG. 8, each plot, for a transmitting antenna 812-1 . . . 812-N, shows both the associated weight signal 842-1 . . . 842-N applied to that particular transmitting antenna element and the resulting associated voltage 844-1 . . . 844-N after application of the weight. The bottom plot for the transmitter array shows the total weight 842, which sums to one, and the total voltage 844, which sums to a sinusoidal excitation. In FIG. 8, each plot, for a receiving antenna 816-1 . . . 816-N shows the associated weight signal 846-1 . . . 846-N applied to that particular receiving antenna element. The bottom plot for the receiver array shows the total weight 846, which sums to one.

The various relationships for the signals, transmitter elements, and receiver elements can be represented by:

$$T(t) = A\sin(2\pi f_0) \quad (1)$$

$$= \sum_{i=1}^{N_{t,r}} P_i(t)$$

and $$R(t) = \sum_{i=1}^{N_{t,r}} w_i(t) R_i(t) \quad (2)$$

where $$P_i(t) = w_i(t) T(t) \text{ and } \sum_{i=1}^{N_{t,r}} w_i(t) = 1 \quad (3)$$

T(t) is the excitation function for the moving transmitter, R(t) is the received signal due to moving transmitter and receiver, $P_i(t)$ is the pulse associated with the $i^{th}$ transmitter, $R_i(t)$ is the received signal at $i^{th}$ receiver, and $w_i(t)$ is the weight associated with $i^{th}$ transmitter. As seen in FIG. 8, a linear interpolation can be used for the weights, $w_i(t)$, where at most two antennas radiate or receive at a time. A similar weighting procedure can be used for the case with a single transmitter and a single receiver, where a specific filter can be used to obtain the received voltage for each excitation shown in FIG. 8, from the received voltage associated with an impulse (ultra-wide-band) excitation.

$$R_i(f) = \frac{P_i(f) U_i(f)}{S_i(f)} \quad (4)$$

$$A(f) \overset{FFT}{\underset{IFFT}{\Longleftrightarrow}} A(t)$$

$S_i(f)$ can be a ultra-wide-band pulse spectrum used in a single-antenna case and $U_i(f)$ can be the received signal due to $S_i(f)$, at measurement i. Fourier transform can be used to convert between frequency-domain and time-domain versions of the functions.

Figure 9:
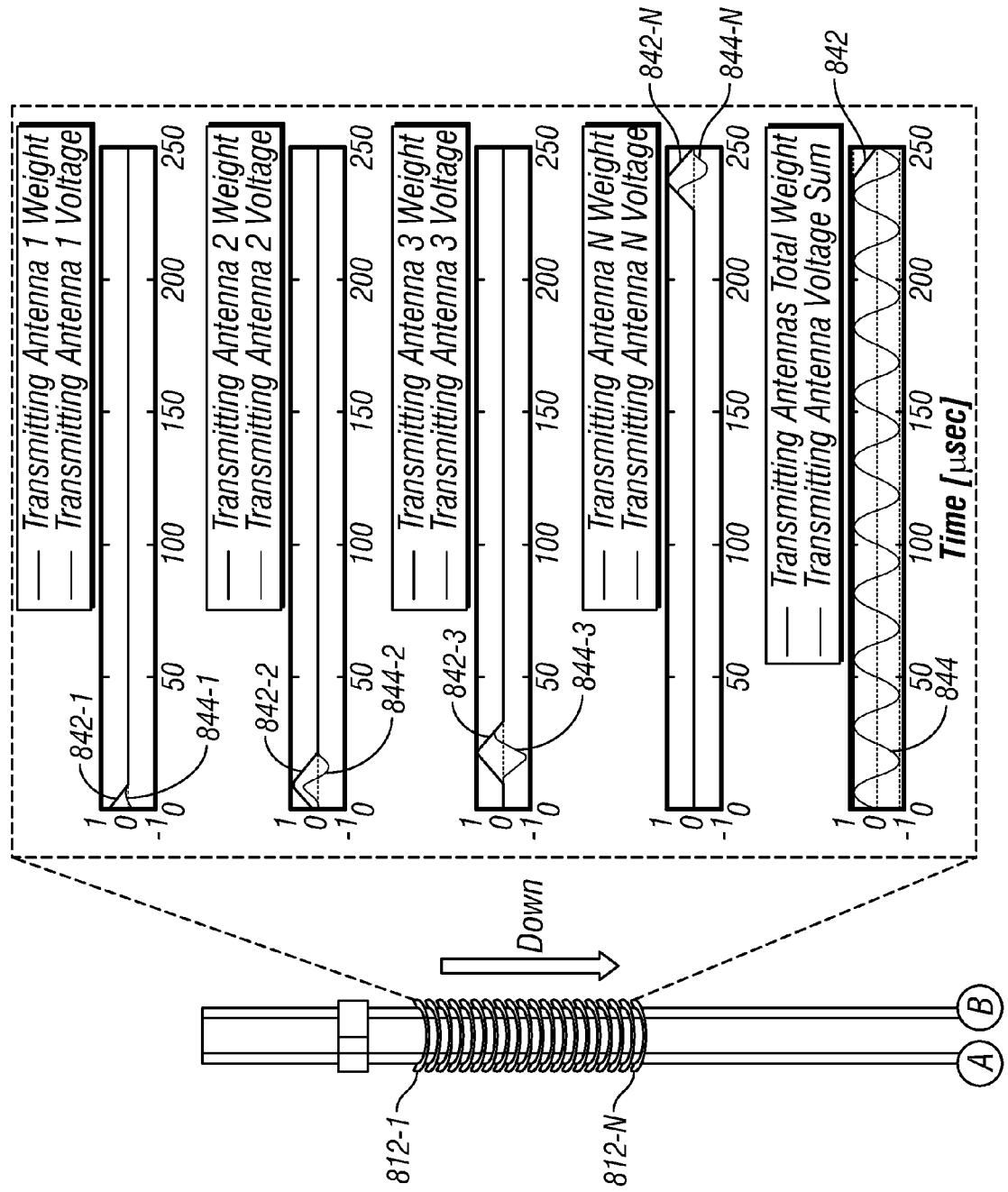
FIG. 9 shows an embodiment of a method in which antenna pulses are generated to imitate a moving transmitter and receiver having opposite directionality.
Figure 9:
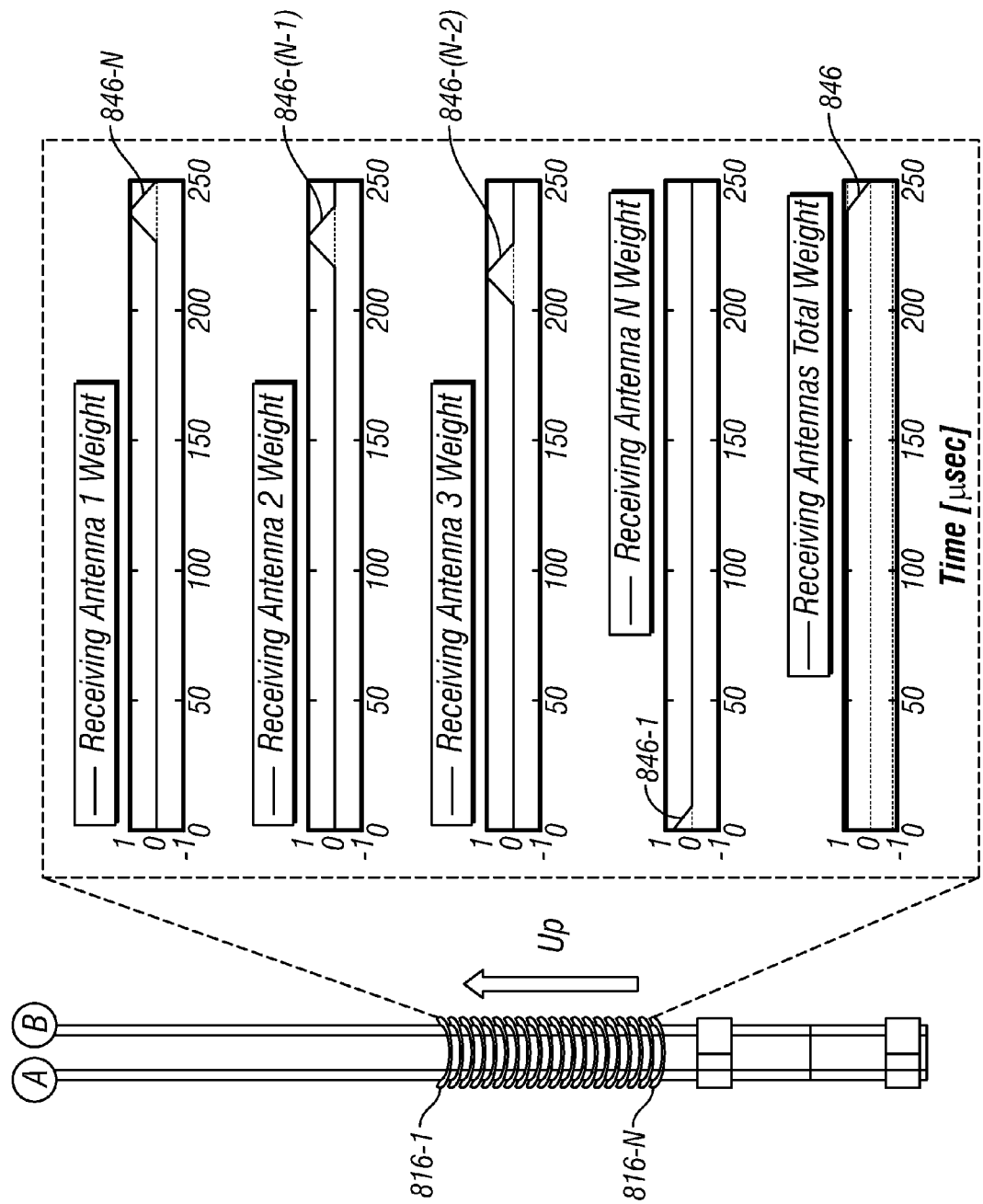

FIG. 9 shows an embodiment of a method in which antenna pulses are generated to imitate a moving transmitter and receiver having opposite directionality. The scheme shown in FIG. 9 provides a different excitation scheme from that shown in FIG. 8. In FIG. 9, excitation of the transmitting antennas start from the top, antenna 812-1, of the associated antenna array and collecting signals from receiving antennas starts from the bottom, antenna 816-N, of the associated antenna array. The excitation and signal collection move in opposite directions. In an embodiment, the weights and pulses used in the scheme of FIG. 9 can be the same with that described for FIG. 8 for the transmitter antenna, and flipped upside down for the receiver antenna, that is, top receiving antenna weight in FIG. 8 goes to the bottom in the case shown in FIG. 9. Although infinitely many excitation schemes can be produced by considering transmitting and receiving signals moving in different directions with different speeds, the excitation schemes shown in FIG. 8 and FIG. 9 can form a complementary and adequate set.

Figure 10:
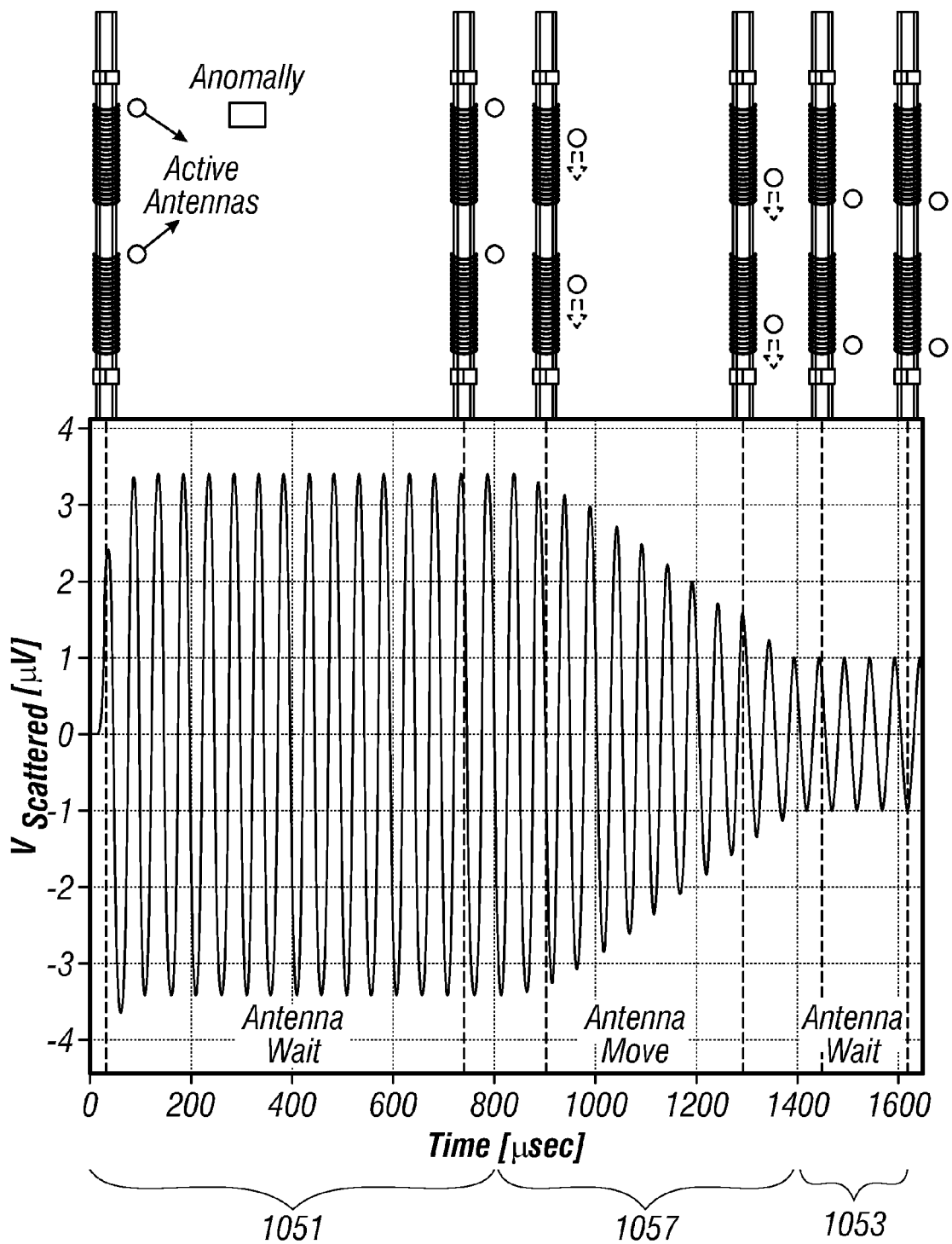
FIG. 10 shows the signal received from a single anomaly at different excitation stages.

FIG. 10 shows an embodiment a signal received from a single anomaly at different excitation stages. The excitation and reception starts at the top of the transmitting and receiving antenna arrays, respectively. In the initial stage, the top-most antennas are the only ones that are active and the received signal frequency is equal to the frequency of excitation. This stage is sustained (antenna wait 1051) for a sufficient amount of time to allow the transients, which are due to the initial turn-on effect, to settle down. In the antenna move stage 1057, the scheme, described in Equations (1)-(4) and shown as examples in FIGS. 8 and 9, can be used to move the excitation and reception electronically from the top of the antenna arrays to the bottom of the antenna arrays. As it can be seen in FIG. 10, with both transmitting and receiving antennas moving away from the anomaly, a reduction in signal is observed in the received signal during the move. Although it is not immediately evident from FIG. 10, a frequency smaller than the frequency of excitation, $f_c$, is produced in this operational phase due to the Doppler effect. The amount of deviation in frequency is indicative of the location of the object. Excitation may be sustained for a relatively short period of time (antenna wait 1053) at the bottom-most antennas in a final operational phase.

Figure 11:
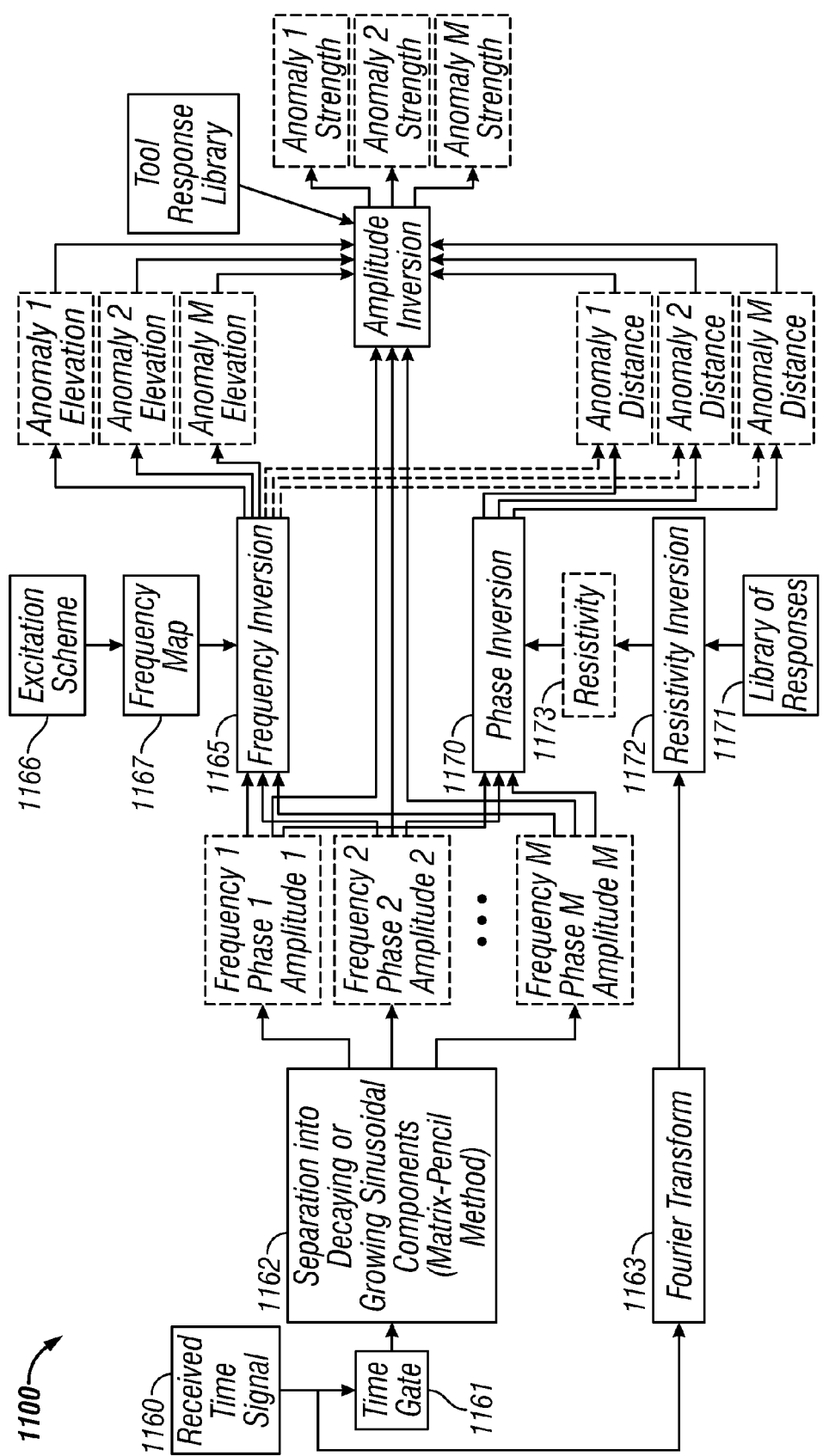
FIG. 11 shows an embodiment of components that operate as an inversion scheme to convert data from antennas, which imitate a moving antenna, into information regarding multiple anomalies.

FIG. 11 shows an embodiment of components that operate as an inversion scheme 1100 to convert data from antennas, which imitate a moving antenna, into information regarding an anomaly. Inversion scheme 1100 can include a numerical inversion scheme conducted using one or more processors executing instructions stored in a memory. The obtained information can include the location and reflection intensity associated with anomalies in the environment. As a preliminary step, the signal obtained at the receiving antennas can be processed as described in Equations (1)-(4) and shown as examples in FIGS. 8 and 9. The processed signal, such as outputs from summers 637 and 737 of FIGS. 6 and 7, respectively, can be produced as a synthetic received time signal 1160 providing an approximation to the signal associated with the moving antenna. In the inversion process, received time signal 1160 can be passed through a time gate 1161.

Time gate 1161 picks only a certain portion of the received signal at which antennas are effectively moving and initial transients have died out. The signal from time gate 1161 contains a sum of signals originating from different anomalies, where each anomaly contributes as a different frequency. Straightforward spectral processing, for example using a Fourier Transform, can be applied to the sum of signals. However, since the frequency band associated with each anomaly is in the proximity of the central frequency and in the proximity of the frequency bands for the other anomalies, and since the received time signal is relatively short, in general, it may not be practical to separate different frequencies by using such straightforward spectral processing. Furthermore, due to conductive losses, the received signal from each anomaly either decays (antenna moving away from anomaly) or grows (antenna moving towards the anomaly).

A component 1162 can be used to separate the signal into decaying or growing exponential components. In embodiment, a Matrix-Pencil method can be used. Component 1162, such as a component including a Matrix-Pencil method, outputs frequencies and associated magnitudes of the signals, where each frequency corresponds to a different anomaly in general. Each excitation scheme has a different distribution of frequencies in space as a function of target location. Therefore, a single excitation scheme produces a non-unique output and typically alone it does not pinpoint the location of the object. A frequency map 1167 can be applied to an excitation scheme 1166 to generate frequency inversion 1165 of the frequencies from component 1162 to identify the elevations 1-M corresponding to the anomalies 1-M.

Figure 12A:
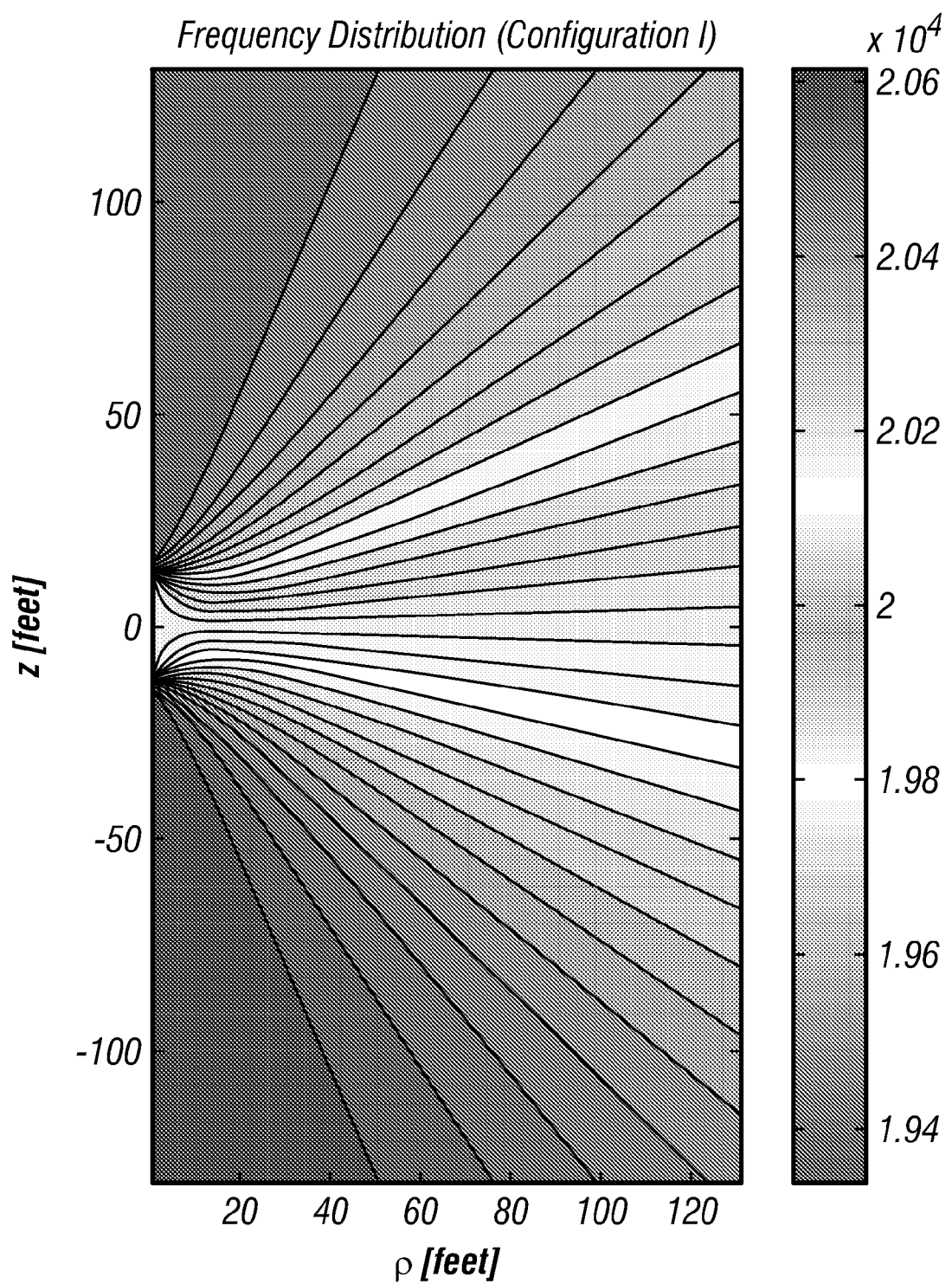
FIG. 12A shows frequency distribution with respect to transmitter antenna and receiver antenna with imitated movement in the same direction.
Figure 12B:
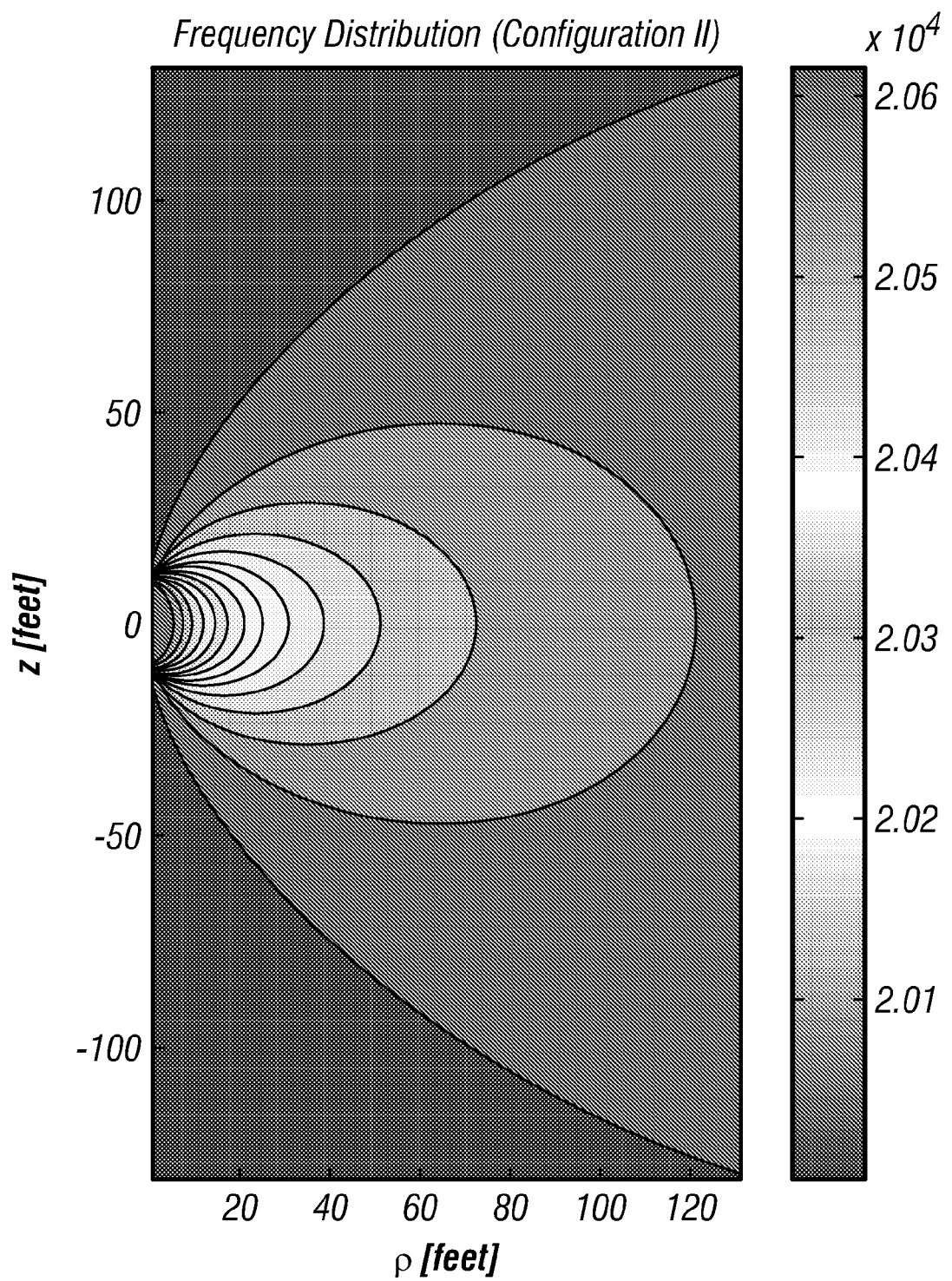
FIG. 12B shows frequency distribution with respect to transmitter antenna and receiver antenna with imitated movement in opposite directions.

FIG. 12A shows frequency distributions with respect to transmitter antenna and receiver antenna with imitated movement in the same direction. FIG. 12B shows frequency distributions with respect to transmitter antenna and receiver antenna with imitated movement in opposite directions. FIGS. 12A-B shows frequency distributions with respect to target location for example embodiments of excitation schemes in FIGS. 8 and 9, respectively, for a case with coil antennas operating at a central frequency $f_c$=20 Khz with separation of 304" and operated with an antenna velocity $v_{ant}$=0.01655 c. It can be seen that the excitation scheme for transmitter antenna and receiver antenna effectively moving in the same direction is sensitive to elevation of the anomaly, especially when the anomaly is located far from the transmitter antenna array and receiver antenna array. In various embodiments, sensitivity of the frequency with respect to angular position can be calculated as 10 Hz per degree for the antenna velocity considered. On the other hand, the excitation scheme for transmitter antenna and receiver antenna effectively moving in the opposite direction is sensitive to distance of the anomaly, especially for small elevation. In various embodiments, sensitivity of the frequency with respect to distance can be 10 Hz per feet at around 20 feet distance from the tool. In both cases, sensitivity of the frequency with the position for high elevation angles θ>75 tends to be very low. As a result, elevation of the anomaly can be given by the excitation in FIG. 8, and distance to the anomaly can be given by the scheme in FIG. 9.

The distance to anomaly can be more sensitive to the phase information, when compared to the frequency information. Therefore, more accurate estimation for distance to each anomaly may be made by utilizing the phase output from the Matrix-Pencil method instead of the frequency. A numerical inversion can be carried out by comparing the phase associated with each anomaly to the phase of the Green's function at each location in the computational domain The background resistivity value, 1173 of FIG. 11, to calculate the Green's function can be numerically inverted in resistivity inversion 1172 by comparing one or more frequency components of the received time signal to a library of pre-compiled responses 1171. The one or more frequency components of the received time signal 1160 can be derived from a Fourier Transform 1163. Phases 1-M and resistivity 1173 provide phase inversion 1170 to identify each distance 1-M corresponding to the respective anomalies 1-M.

Numerical inversion scheme 1100 can be realized using one or more processors arranged to operatively execute instructions stored in machine readable storage medium. A variety of types of machine readable storage medium can be used to perform operations to imitate a moving antenna to locate downhole anomalies in a manner similar to or identical to the operations discussed herein.

The sensitivity of frequency with respect to location can be increased by increasing antenna velocity, $v_{ant}$. However, increasing antenna velocity reduces the time duration of the received signal, which may make successful separation of signals in the Matrix-Pencil operation difficult. Although various embodiments for imitating a moving antenna and executing an inversion scheme, such as numerical inversion scheme 1100, may operate more efficiently at high frequencies, very accurate results can also be obtained at the low end of the spectrum In conventional resistivity tools based on induction measurements, low frequency measurements provide information regarding both the shallow and deep formations in mixed form. If not enough information is available, shallow and deep contributions can not be separated, which translates to low resolution and inversion problems. In various embodiments, a tool using a Doppler methodology based on effective antenna movement and stationary targets can separate contributions from different anomalies, which can alleviate problems associated with low resolution and inversion problems of conventional resistivity tools. A Doppler methodology based on antenna movement can operate with respect to stationary targets to identify underground anomalies, rather than using a scheme with stationary antennas and moving targets.

In various embodiments, since each anomaly produces a different frequency, their contributions can be separated and used to perform accurate localization of multiple anomalies even at low frequencies. Similarly, since direct fields have a different frequency, when compared to reflected fields, the direct fields can be more easily separated from the received signal when compared to regular resistivity tools. In various embodiments, a tool, which imitates a moving antenna and applies a Doppler effect methodology, can locate anomalies both in the radial direction and in the direction of tool axis. The tool axis can be the axis of a collar along a drill string. A background resistivity measurement can also be made with such a tool. A Doppler based tool that imitates a moving antenna can offer superior steering of a drilling operation due to deep and detailed evaluation of formations.

Figure 13A:
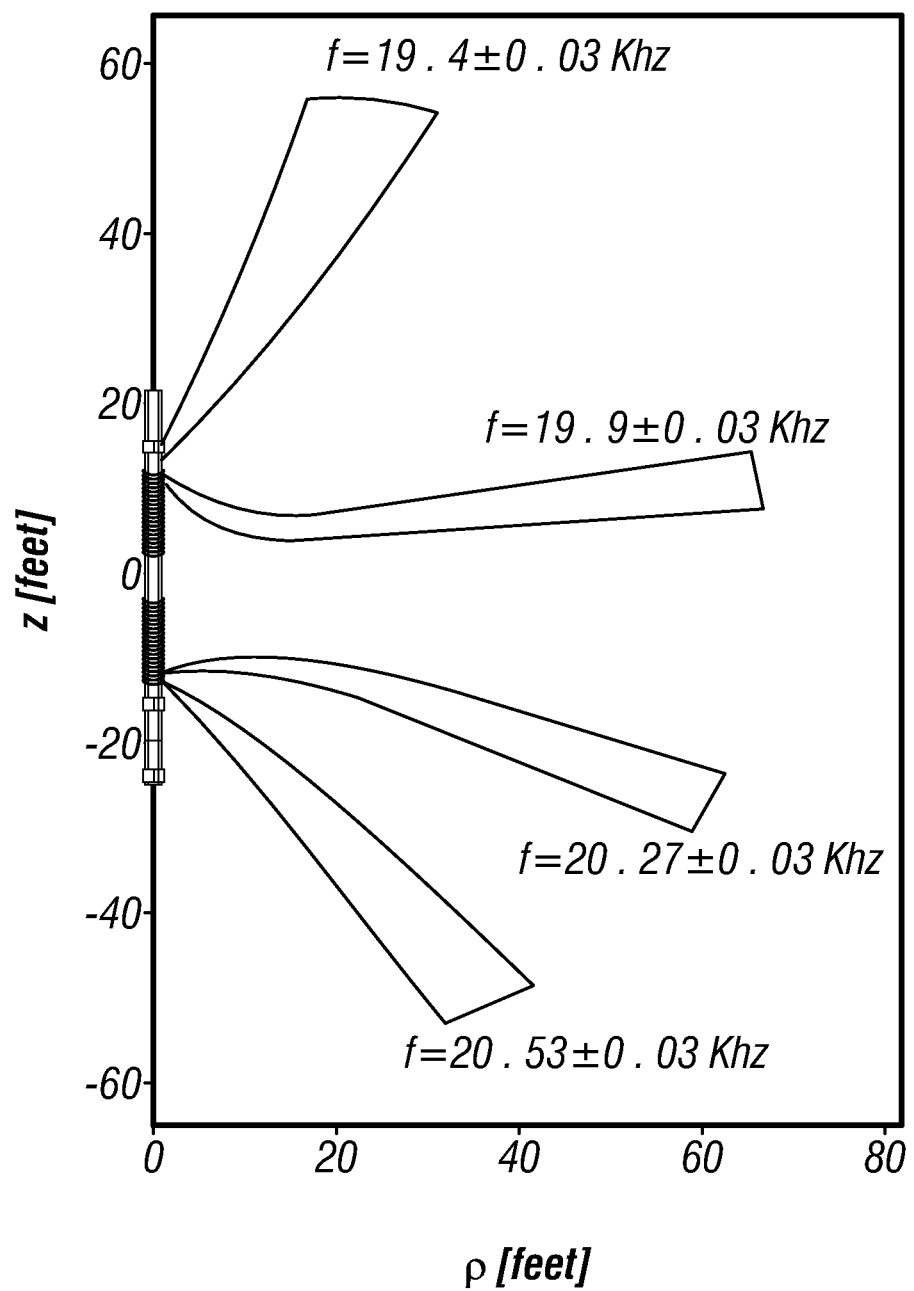
FIGS. 13A-B shows the sensitivity of an embodiment of the Doppler based tool relative to anomaly elevation and distance.
Figure 13B:
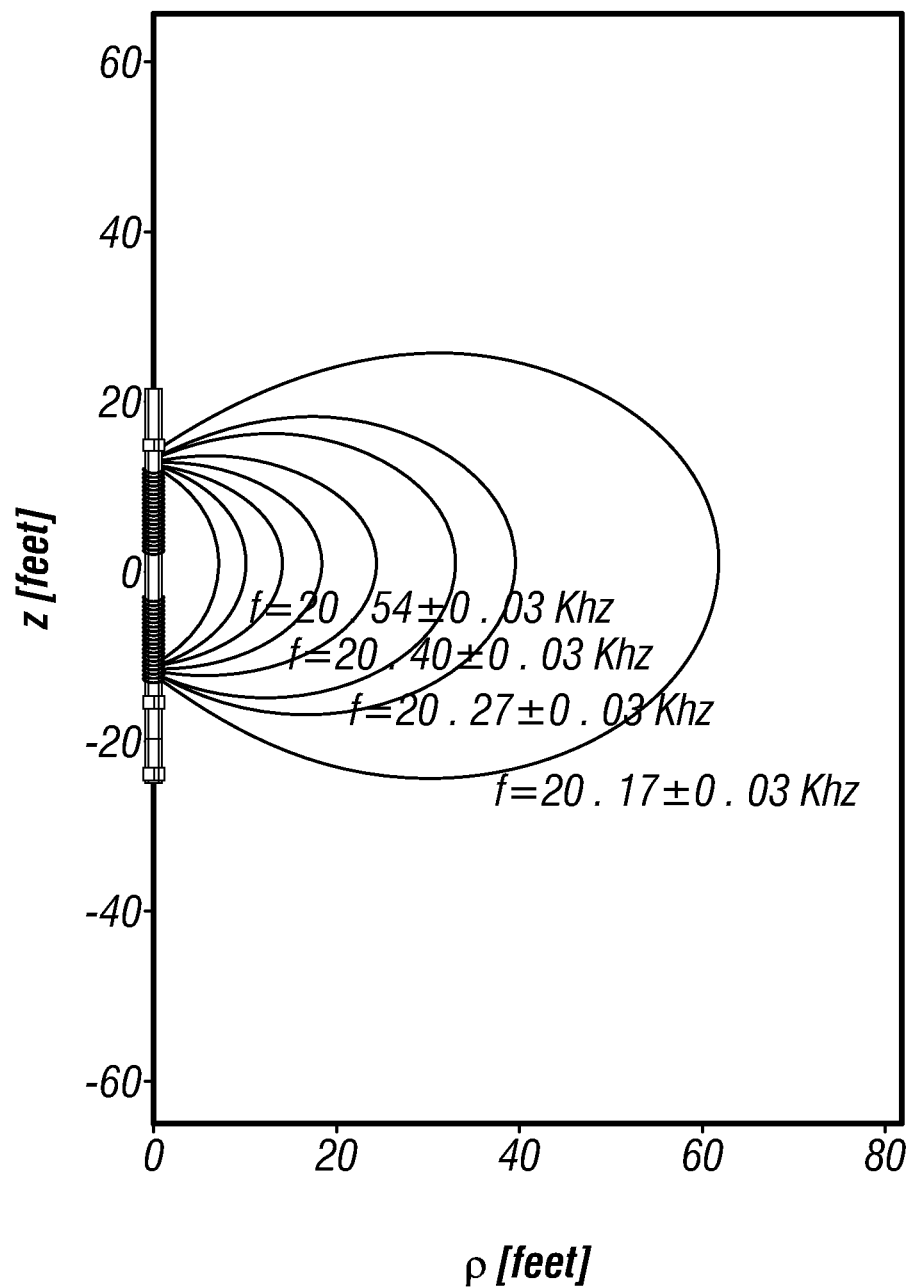

FIGS. 13A-B shows the sensitivity of an embodiment of a Doppler based tool to anomaly elevation and distance. In an example, FIGS. 13A-B shows the sensitivity for the example excitation schemes in FIGS. 8 and 9, respectively. Such a tool can offer deep accurate localization of anomalies at low frequencies compared to conventional tools for drilling operations. FIG. 13A shows elevation sensitivity, while FIG. 13B shows distance sensitivity. It can be seen in FIGS. 13A-B that, although a relatively low frequency, $f_c$=20 KHz, is used, where the wavelength is typically in the range 50-330 feet, 2-3 feet accuracy can be obtained at low elevation. A 5-15 feet accuracy can be obtained at high elevation with an inversion sensitivity of 30 Hz. Similarly, 3-5 feet accuracy can be obtained for anomalies that are up to 20 feet away with the same inversion sensitivity.

Figure 14A:
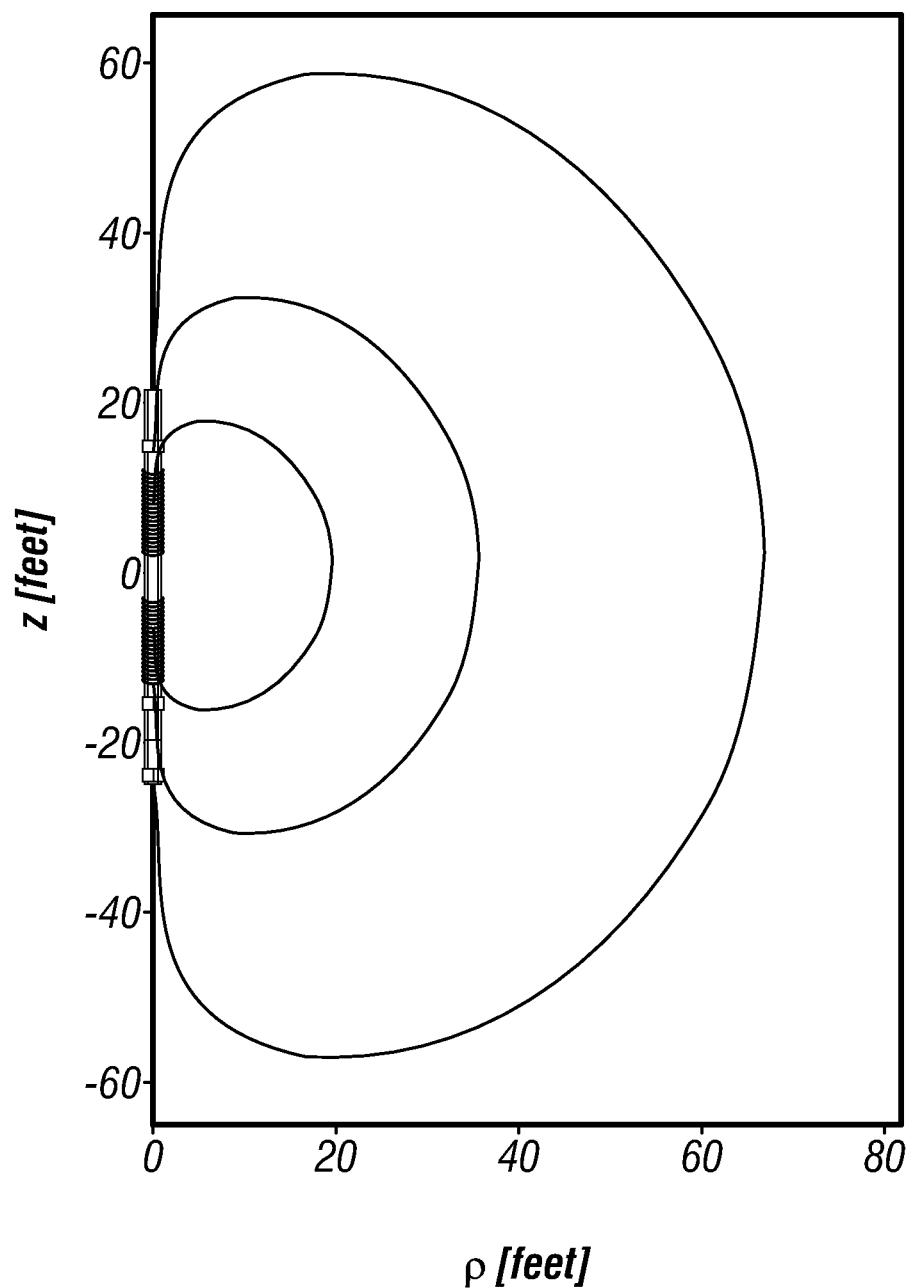
FIGS. 14A-C compare the resolution of three tools in imaging anomalies of unknown nature.
Figure 14B:
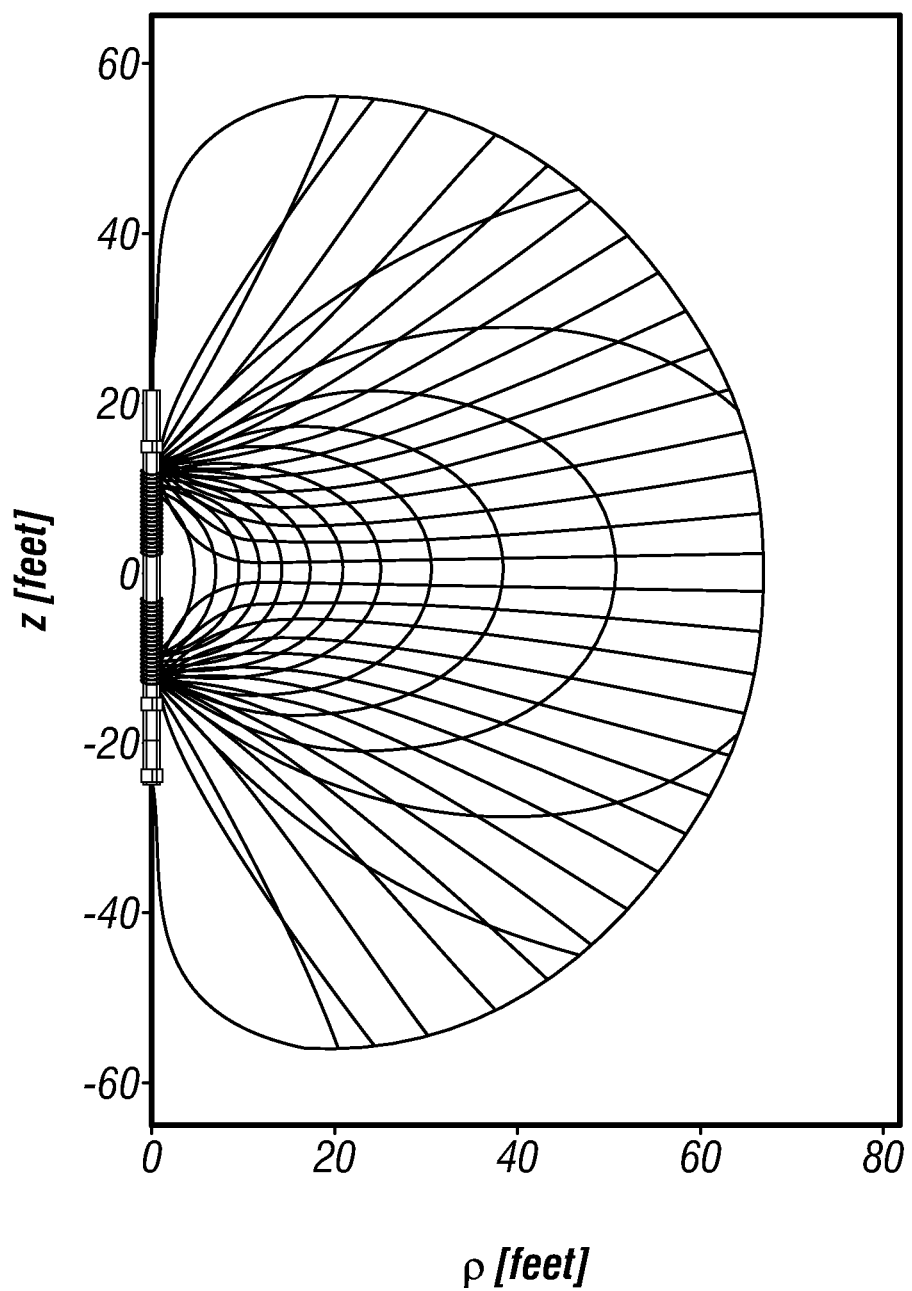
Figure 14C:
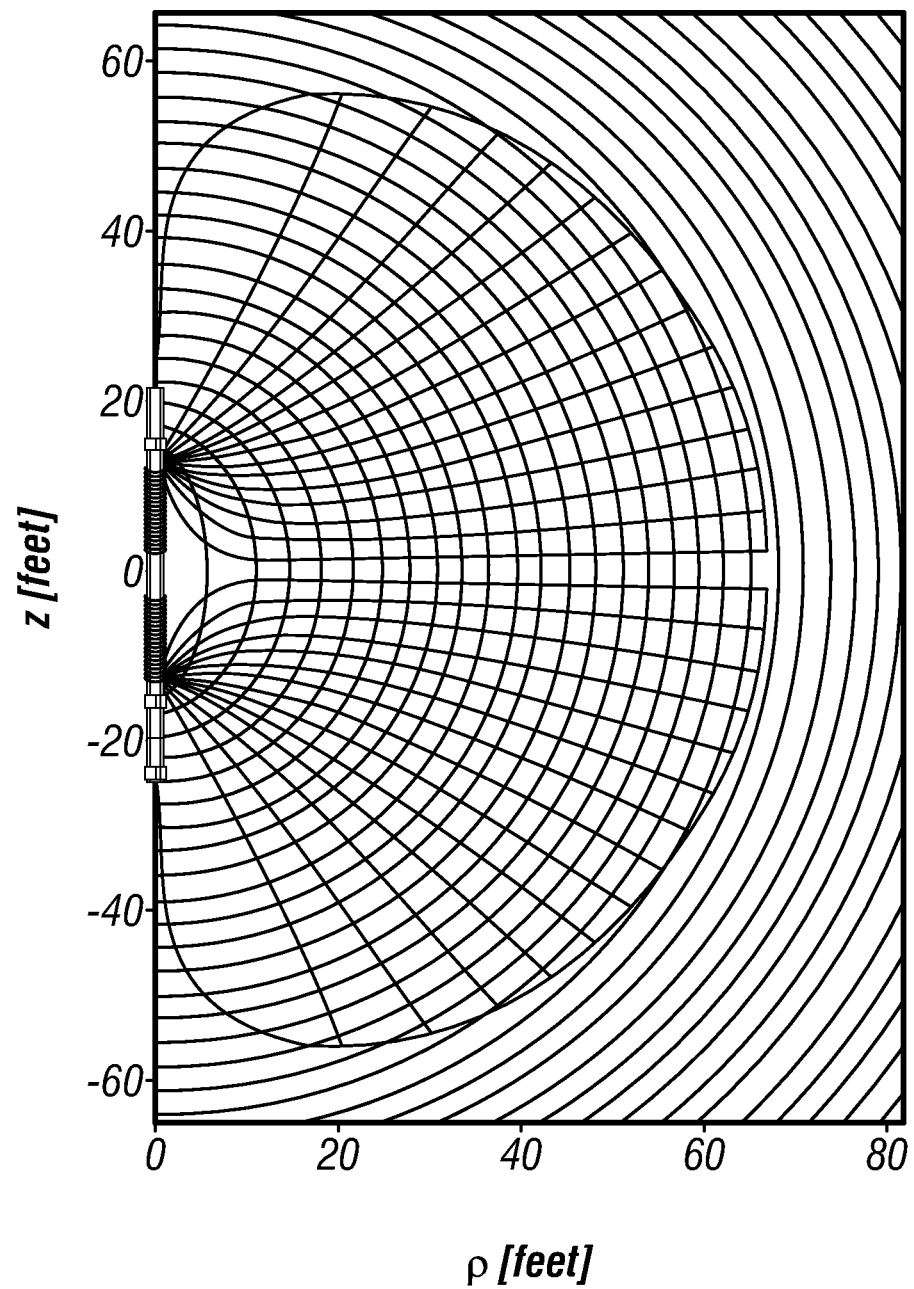

FIGS. 14A-C compare the resolution of three tools in imaging anomalies of unknown nature. FIG. 14A shows tool resolution associated with a simple resistivity tool with three different depth investigations. FIG. 14B shows tool resolution for a Doppler tool without any phase inversion. FIG. 14C shows a Doppler tool with phase inversion. With the simple resistivity tool for FIG. 14A, shallow, medium, and deep resistivity measurements can be made and anomalies can be differentiated up to three different bins. A bin typically is a subdivision of a seismic survey such that the area of a seismic survey can be divided into bins. The Doppler tool resolution based on frequency inversion can be obtained from FIG. 11 using 30 Hz sensitivity, which shows high resolution, especially at small elevation. When combined with phase inversion with 15° accuracy, the resolution of the Doppler tool can be enhanced, as shown in FIG. 14C. The resolutions shown in FIGS. 14A-C are for general problems without any a-priori knowledge or assumption on the shape of the anomalies in the environment. Higher resolutions can be obtained, if given certain information such as the existence of planar formation boundaries, etc. In addition, the maximum number of anomalies that can be recovered can depend on the logarithm of the noise level and the number of periods in the received signal. With such a limitation for the maximum number of anomalies, although a high number of bins are shown in FIGS. 14B-C, only smaller number of anomalies can be recovered simultaneously.

Figure 15A:
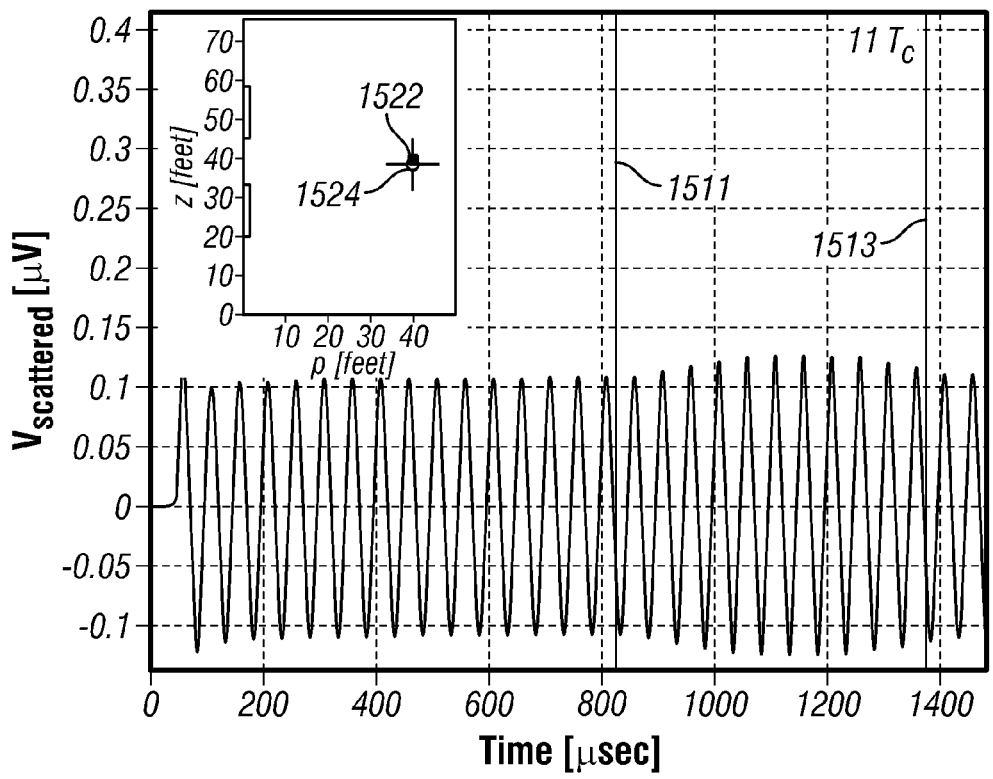
FIGS. 15A-C show received signals from single anomalies at different locations relative to a common antenna location and inversion results for each anomaly.
Figure 15B:
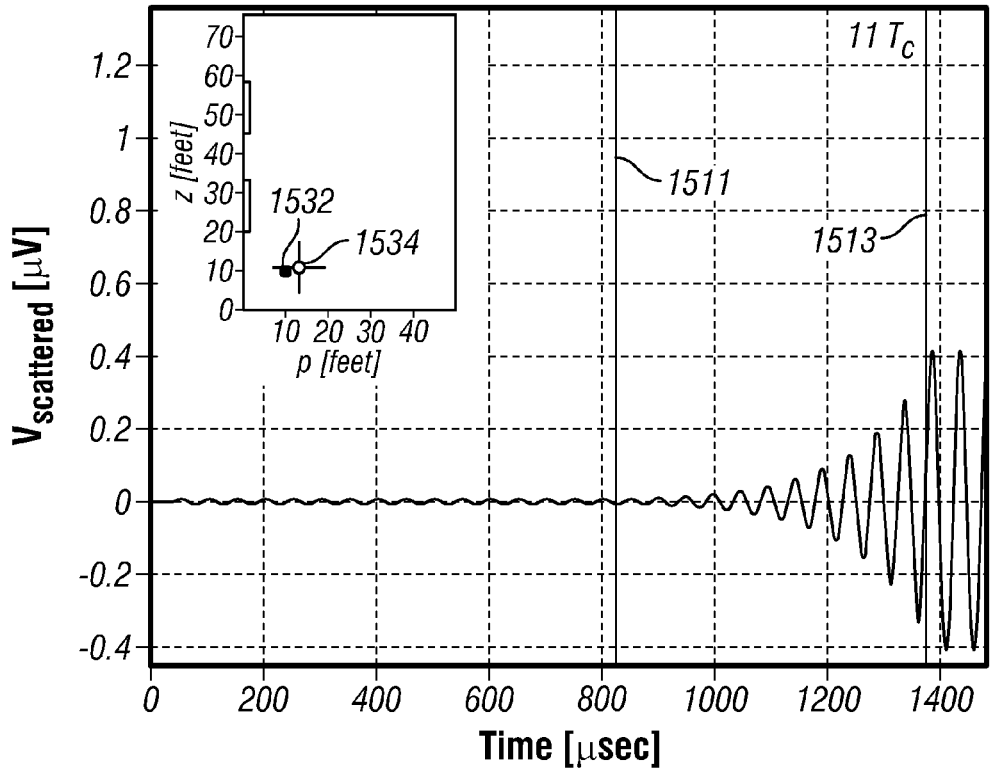
Figure 15C:
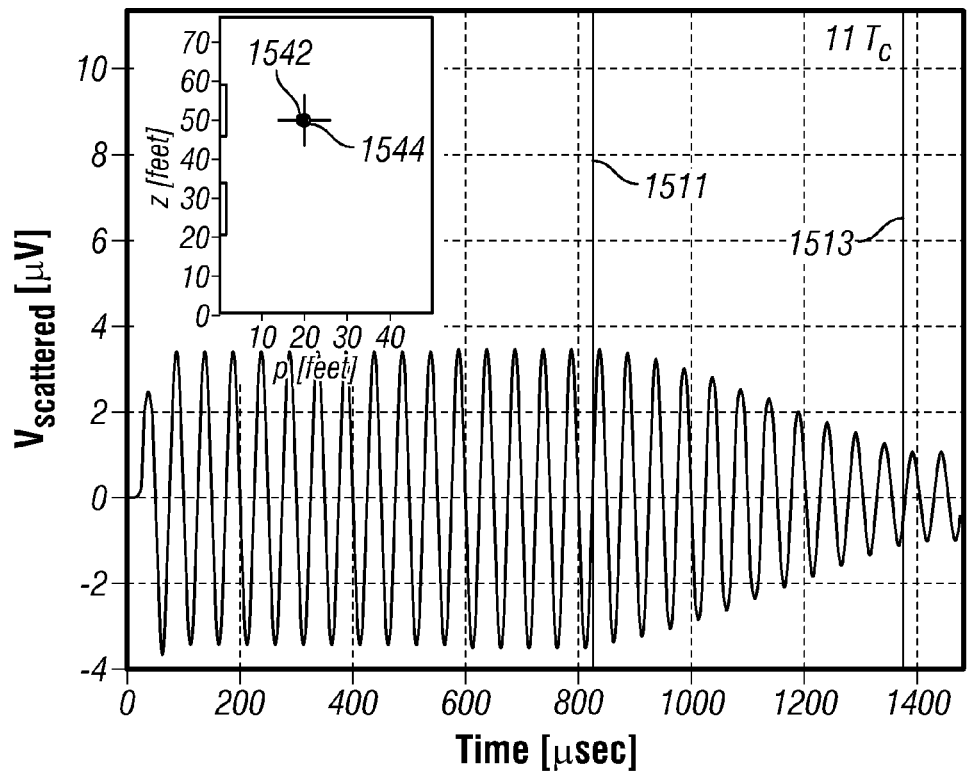
Figure 15D:
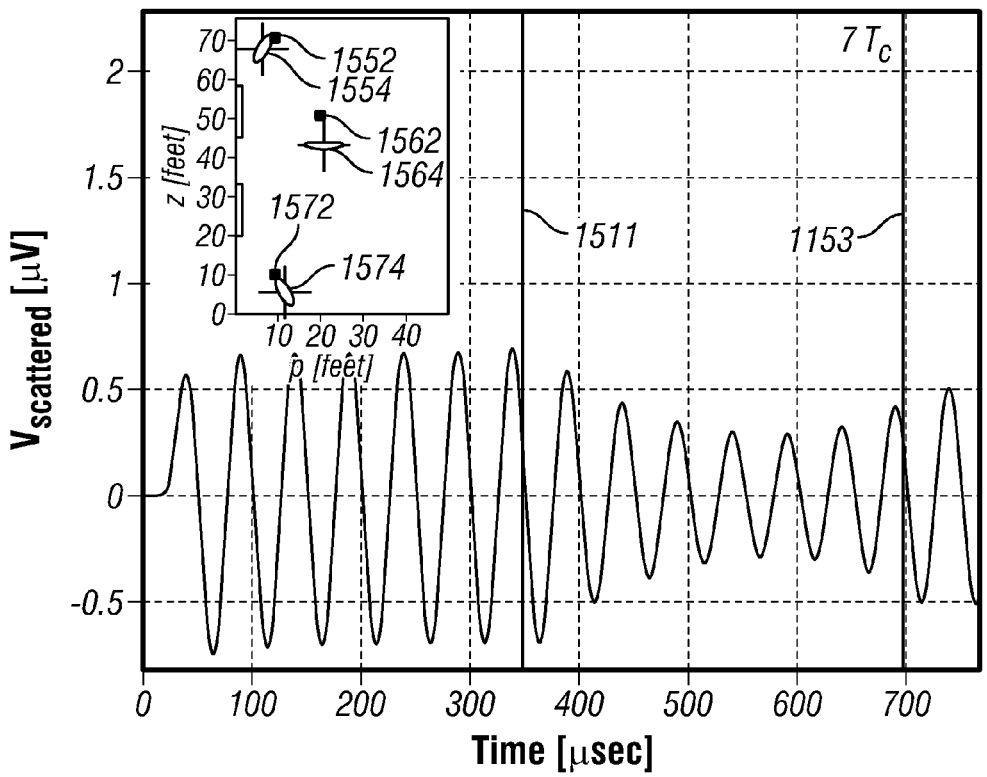
FIG. 15D shows a received signal for simultaneous inversion of three anomalies.
Figure 16A:
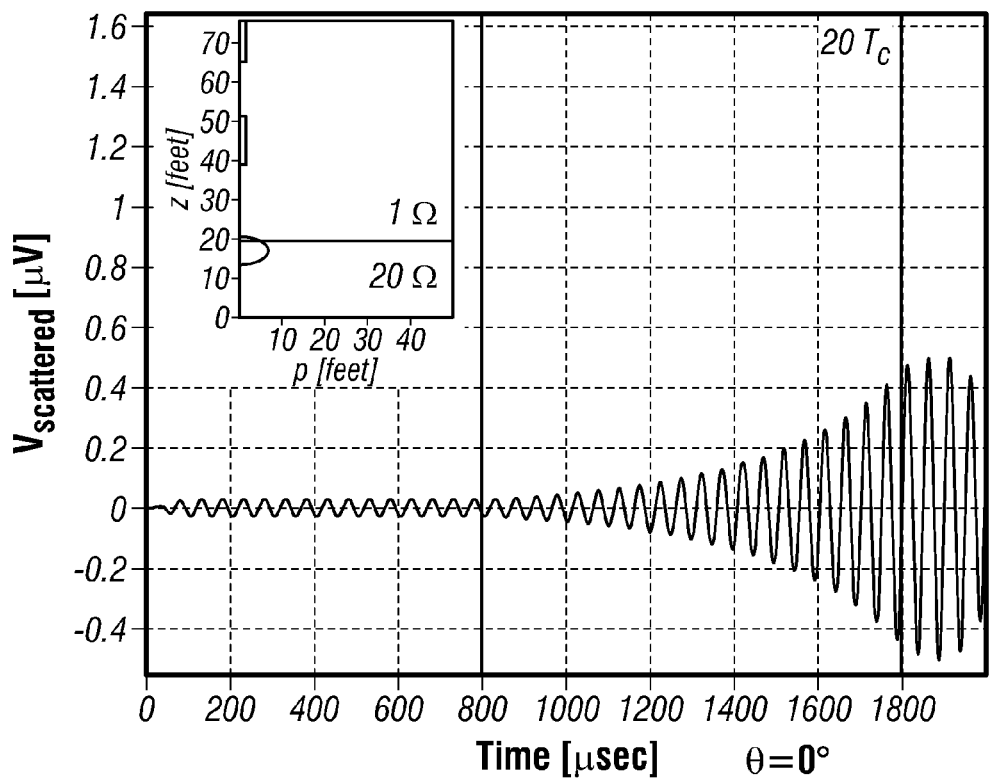
FIGS. 16A-D show signals received from a formation boundary and inversion results for different angles.
Figure 16B:
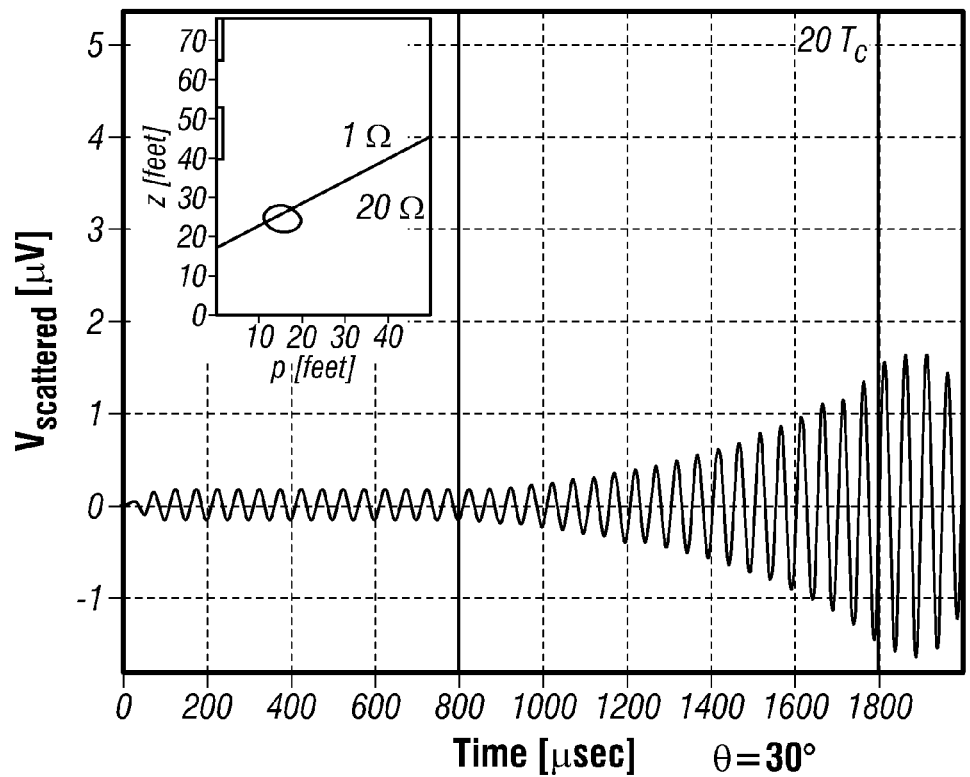
Figure 16C:
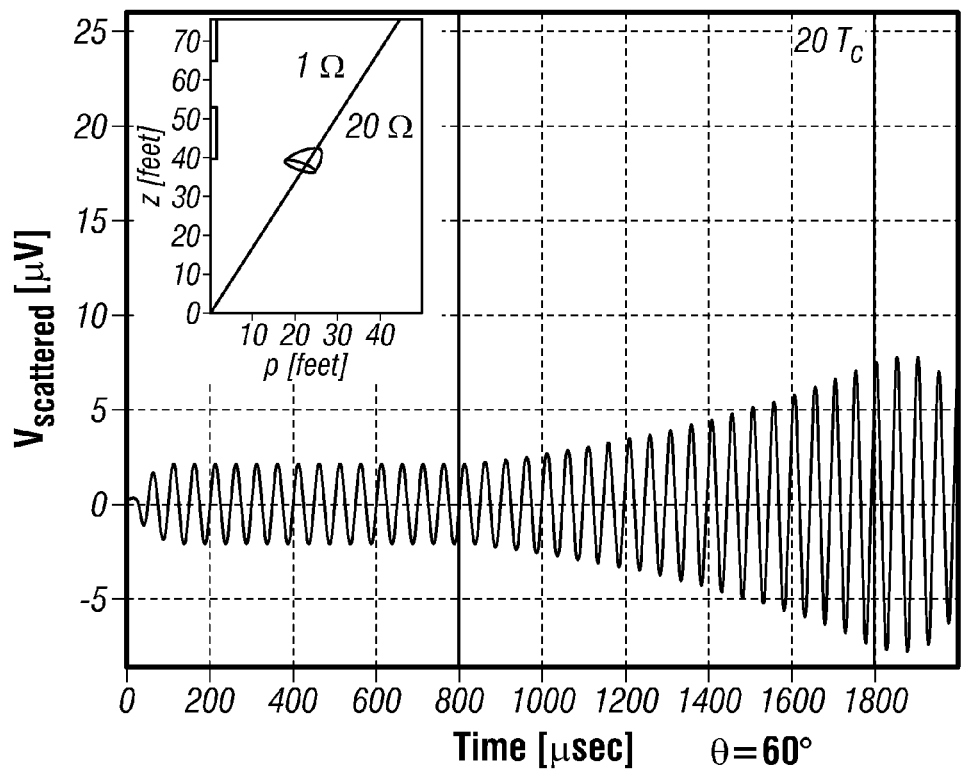
Figure 16D:
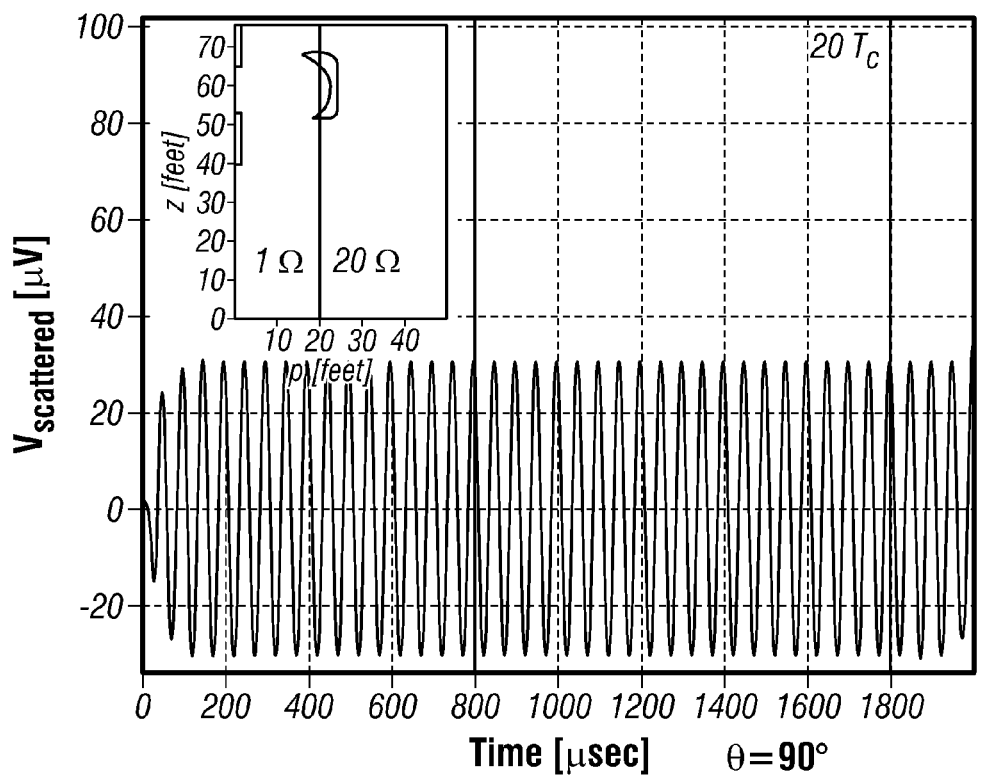

In various embodiments, a Doppler based tool similar or identical to Doppler based tools discussed herein can localize multiple anomalies simultaneously. FIGS. 15A-C show received signals from single anomalies at different locations relative to a common antenna location and inversion results for each anomaly. FIG. 15D shows a received signal for simultaneous inversion of three anomalies. The plots show the reflected signal with respect to time, where the start and end times of the antenna move are indicated by the lines 1511 and 1513. The time duration of the antenna move stage is given in terms of the period (11 $T_c$) associated with the central frequency, $f_c$=20 KHz with z-directed coil antennas. A small inset within each plot shows the result of the inversion. In FIG. 15A, mark 1522 is the exact location of the anomaly and mark 1524 is the inverted (determined) location. In FIG. 15B, mark 1532 is the exact location of the anomaly and mark 1534 is the inverted (determined) location. In FIG. 15C, mark 1542 is the exact location of the anomaly and mark 1544 is the inverted (determined) location. In FIG. 15D, mark 1552 is the exact location of the anomaly and mark 1554 is the inverted (determined) location for one anomaly, mark 1562 is the exact location of the anomaly and mark 1564 is the inverted (determined) location for a second anomaly, and mark 1572 is the exact location of the anomaly and mark 1574 is the inverted (determined) location for a third anomaly. In the time gate operation in FIG. 11, time region start and end are set at 10% and 100%, respectively, of the antenna move region in all examples considered here.

It can be seen from FIGS. 15A-D that inversion of all of the anomalies has been carried out successfully, including a case with three anomalies with higher antenna move velocity. As expected, accuracy is lower for cases with high elevation angle, or in a case where multiple anomalies are being inverted.

FIGS. 16A-D show signals received from a formation boundary and inversion results for different angles. The inversion results are shown in the insets. Z-directed coil antennas, with d=19.69 feet, are used with center frequency, $f_c$=20 KHz. The inversion of a planar formation boundary is considered for a 1Ω to 20Ω case for different dipping angles ranging from 0° to 90°. Due to attenuation in highly conductive media, the signal from the planar formation boundary mostly originates from a small region. As a result, formation boundary is detected as a local anomaly, as shown in FIGS. 16A-D. It can be seen from FIGS. 16A-D that the formation boundary can be successfully recovered for all dipping angles.

Figure 17A:
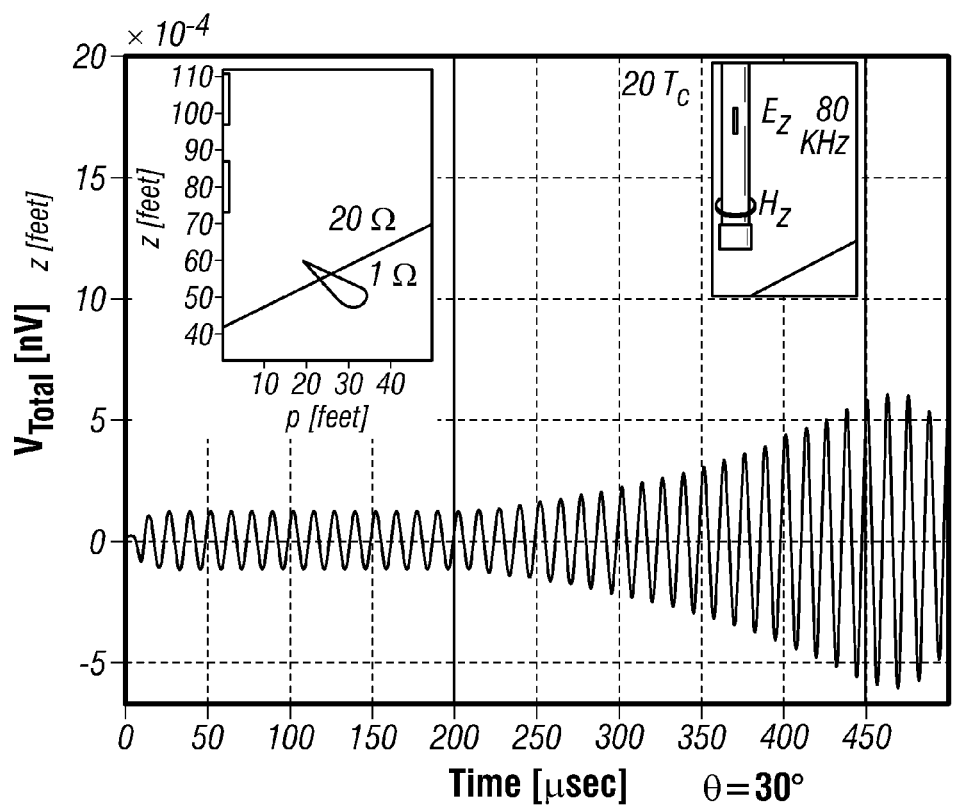
FIGS. 17A-C show signals received from a formation boundary and inversion results for different angles.
Figure 17B:
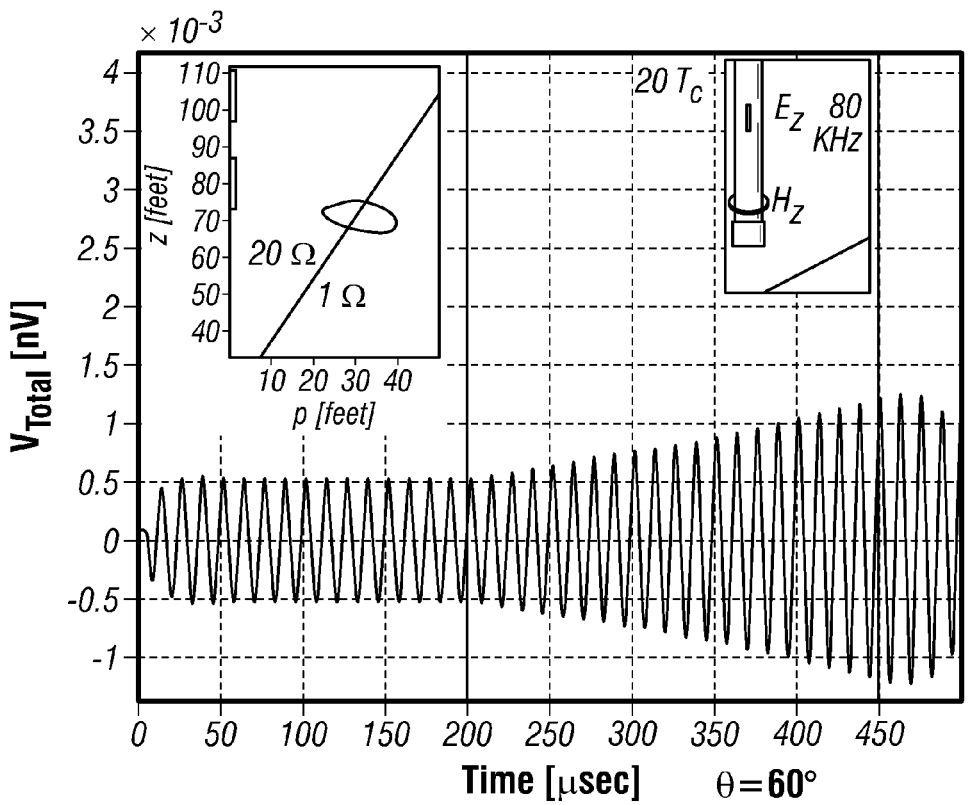
Figure 17C:
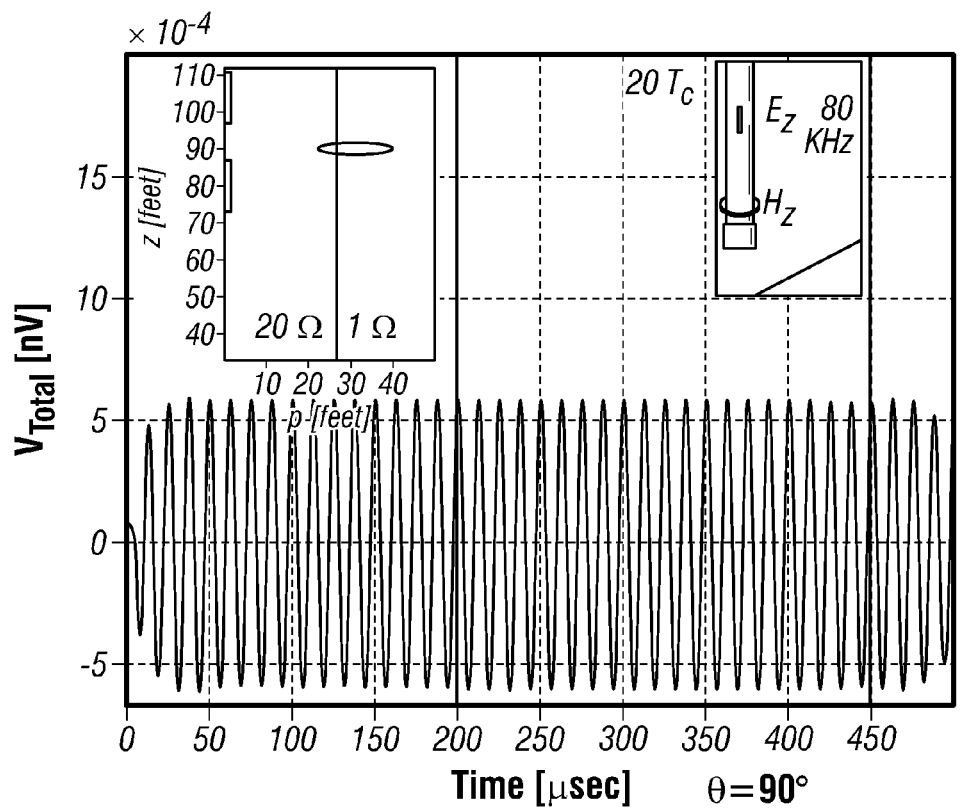

FIGS. 17A-C show signals received from a formation boundary and inversion results for different angles. The inversion results are shown in the insets. In FIGS. 17A-C, a z-directed wire is used as the transmitter and a z-directed coil is used as the receiver. A center frequency, $f_c$=80 KHz, is used with d=26.25 feet. In this configuration, the received signal does not have any direct field component and is composed of purely cross-polarization contribution from the anomalies. Therefore, this configuration can be operated without a compensation scheme to remove the direct fields. It can be seen from FIGS. 17A-C that inversion can be successful in all dipping angles considered. Since cross-polarization component is zero for horizontal formation boundary, inversion may be difficult or may not be possible for small dipping angles in this configuration.

Figure 18:
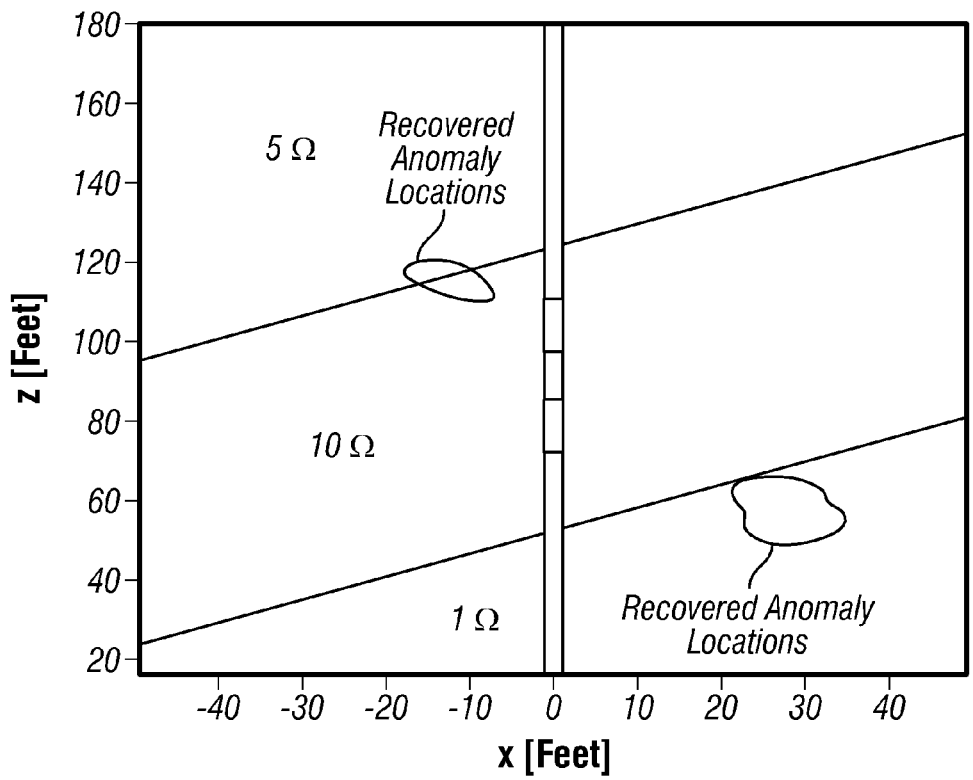
FIG. 18 shows the result of inversion for multiple formation boundaries.

FIG. 18 shows the result of inversion for multiple formation boundaries. In the multi-layered problem shown, three regions with resistivity values of 5Ω, 10Ω, and 1Ω are considered. A tilted coil transmitter, z-directed coil receiver with $d_{lower}$=5.20 feet, $d_{higher}$=3.46 feet, tilt angle θ=30°, is used with center frequency, $f_c$=40 KHz. In this example, the directionality of the anomaly is recovered numerically by taking advantage of the tilt angle and azimuthal sensitivity of the transmitter antennas. As it can be seen from FIG. 18, one anomaly location per boundary layer is successfully obtained.

Figure 19A:
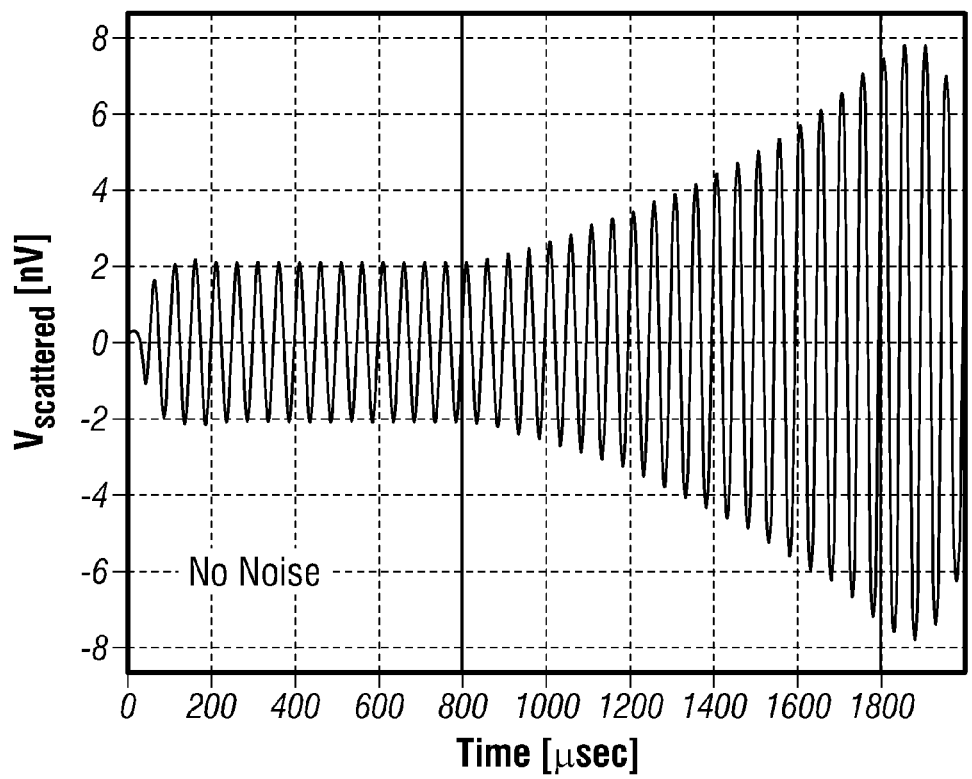
FIGS. 19A-B show signals received from formation boundary with and without noise, respectively.
Figure 19B:
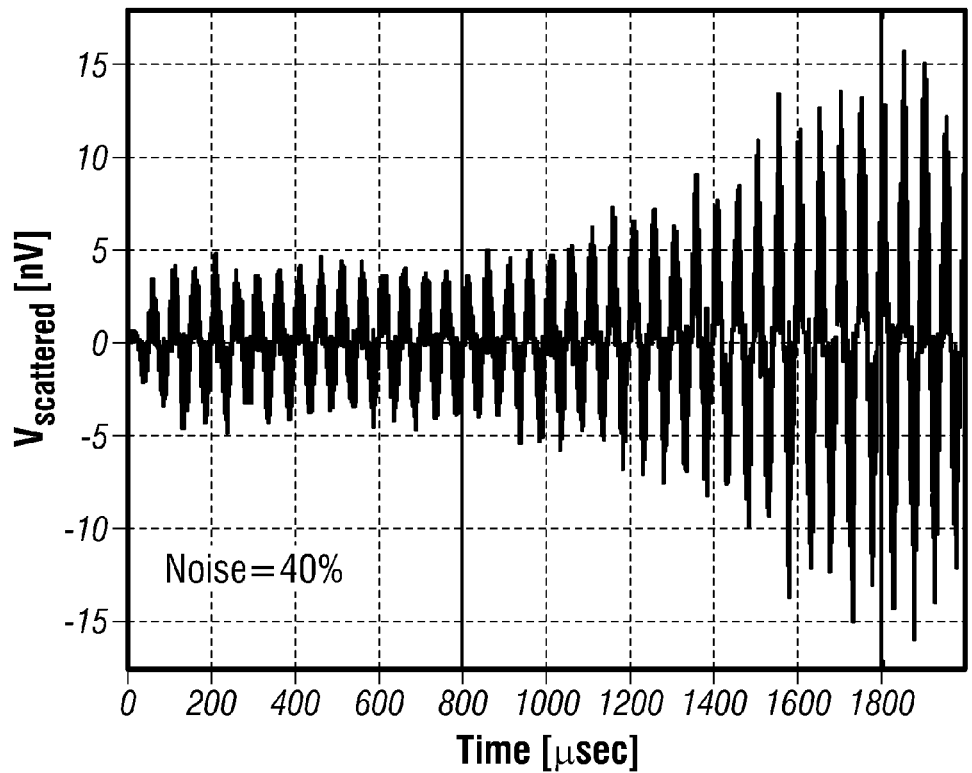
Figure 19C:
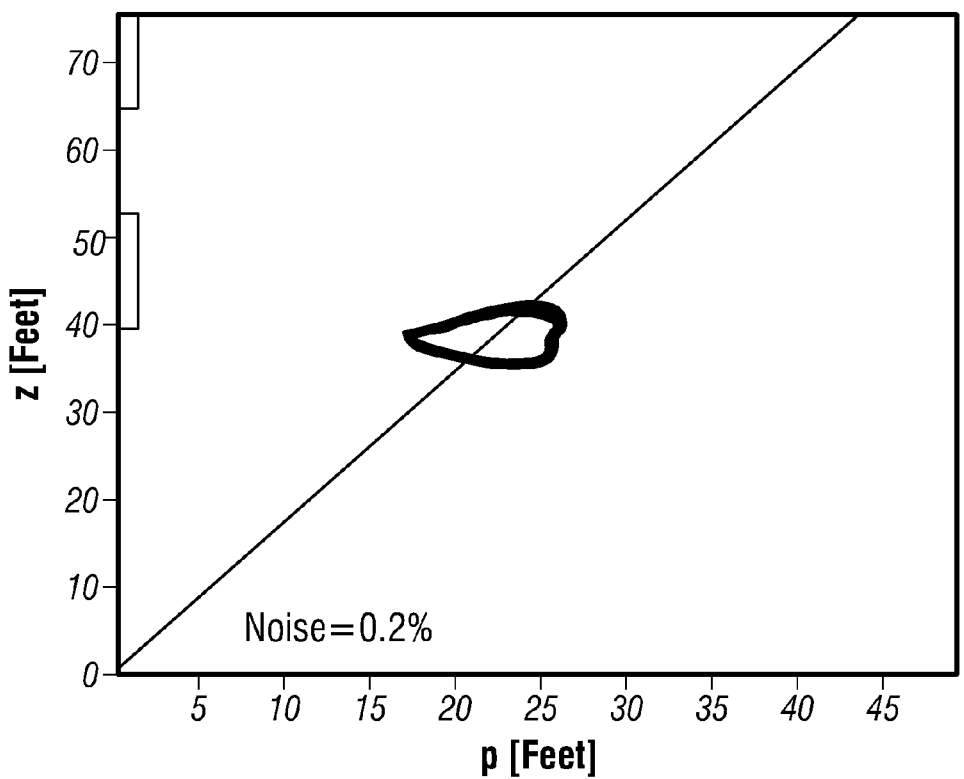
FIGS. 19C-F show inversion results received from formation boundary with noise.
Figure 19D:
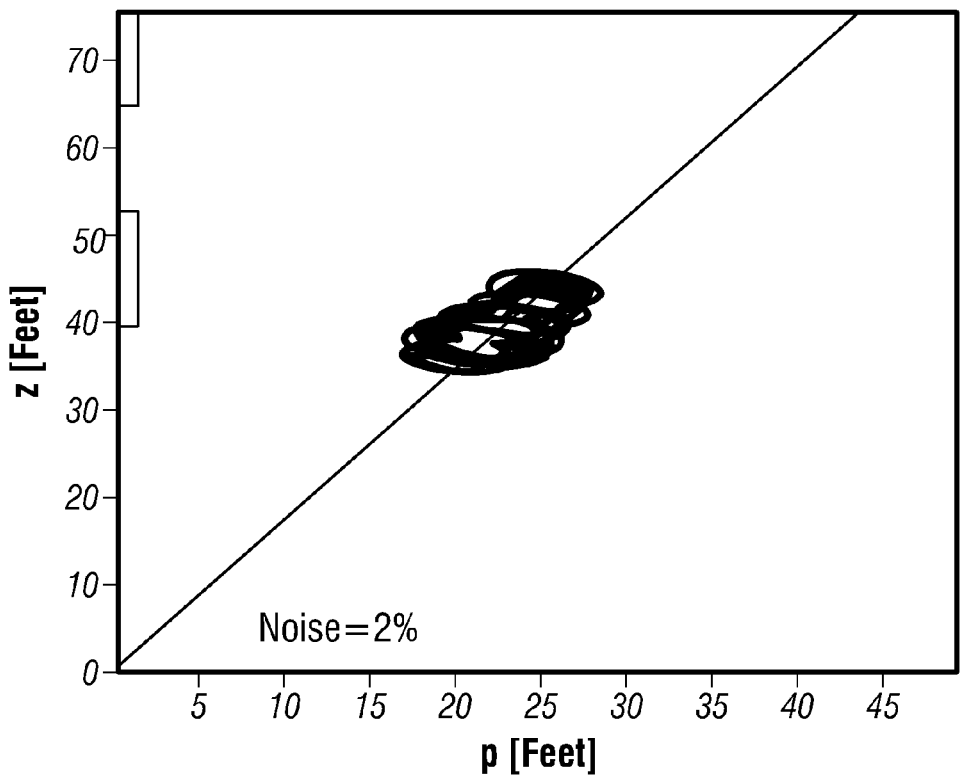
Figure 19E:
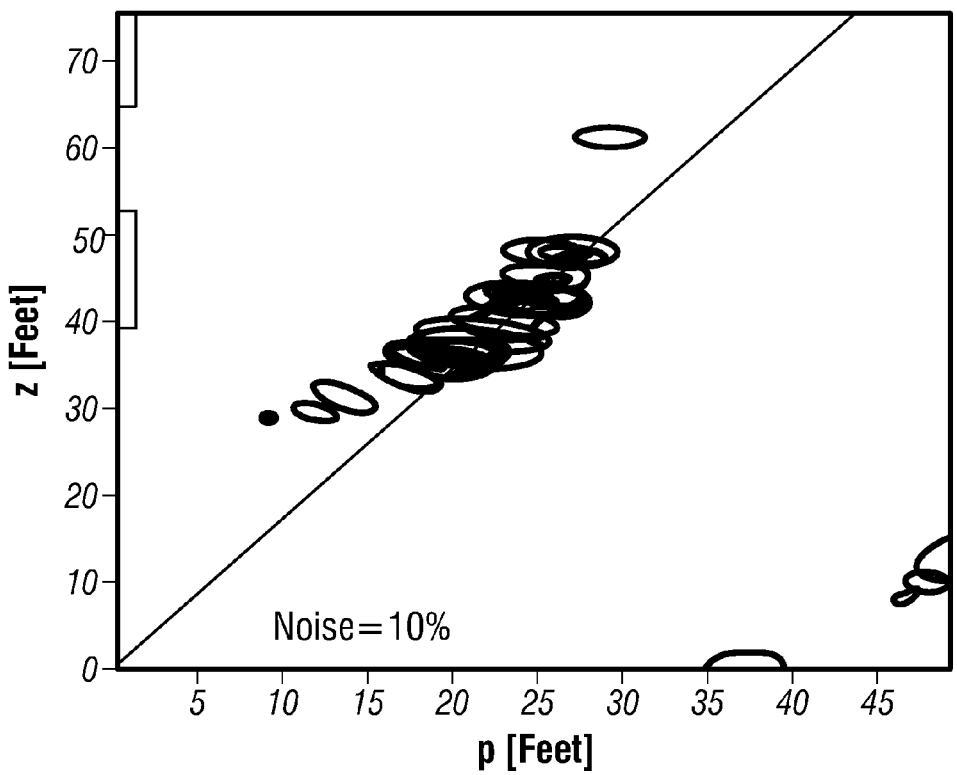
Figure 19F:
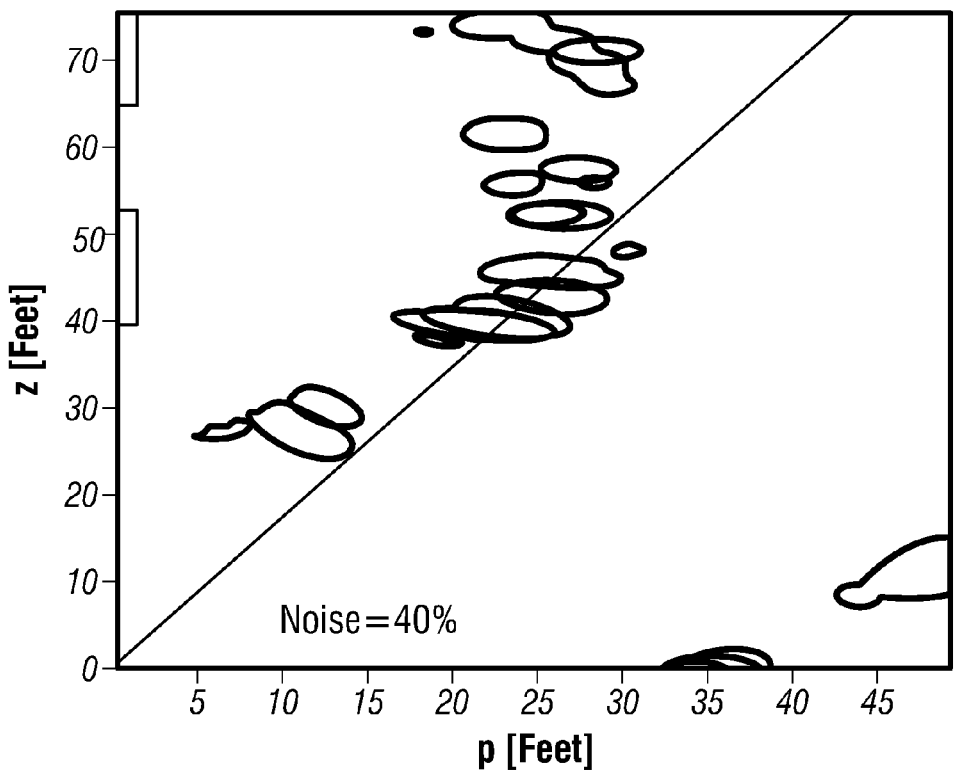

In practice, signal to noise ratio is an important characteristics of the sensor electronics. An analysis of effect of noise on received signal is shown in FIGS. 19A-F. FIGS. 19A-B show signals received from formation boundary with and without noise, respectively. FIGS. 19C-F show 10 superposed inversion results at different noise levels. Z-directed coil antennas with center frequency, $f_c$=20 KHz, d=19.69 feet, θ=60°, are considered for a 1Ω to 20Ω problem. The scattered signal without and with noise is shown in FIGS. 19A-B, respectively. An uncorrelated white Gaussian noise profile with different standard deviation is used in FIGS. 19A-F. The standard deviation at any time point is given by the signal level at that time multiplied by the noise percentage. FIGS. 19C-F superposes the inversion result contours for 10 different noise samples associated with the same problem. It can be seen from FIG. 19C that for 0.2% noise, a very stable inversion performance in observed. On the other hand, FIG. 19F shows that the inversion is unsuccessful for 40% noise level. By investigating noise levels in between, that is, FIGS. 19D-E, it can be concluded that a threshold value of approximately 2% noise in the scattered signal may be appropriate for stable inversion.

Figure 20A:
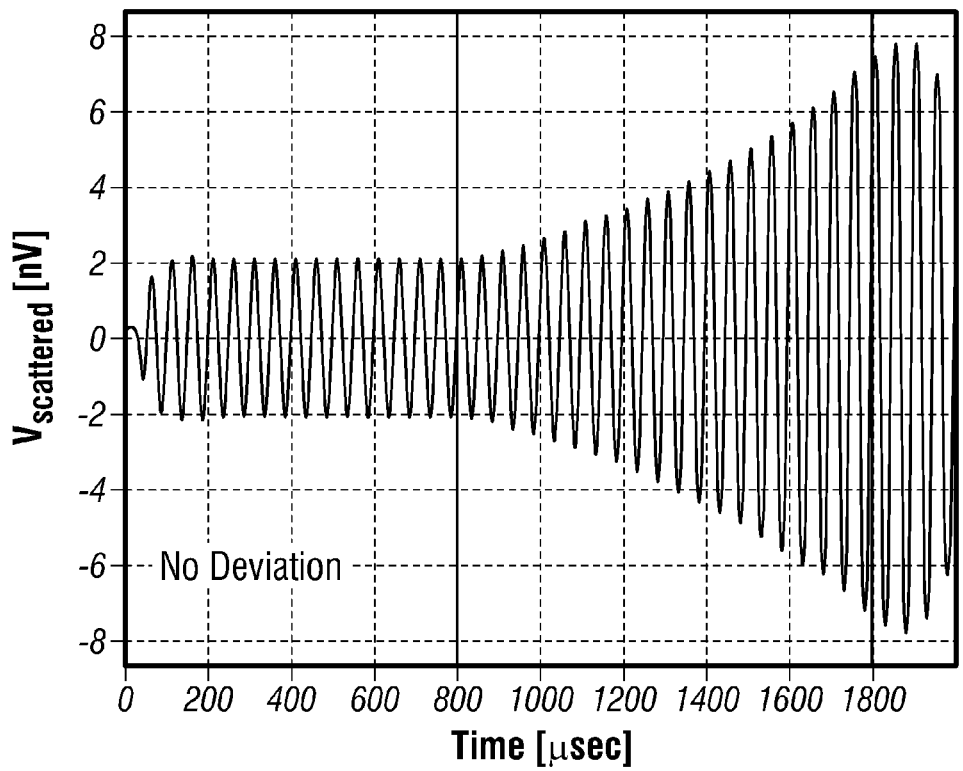
FIGS. 20A-B show signals received from formation boundary for different deviations in picking the sampling points.
Figure 20B:
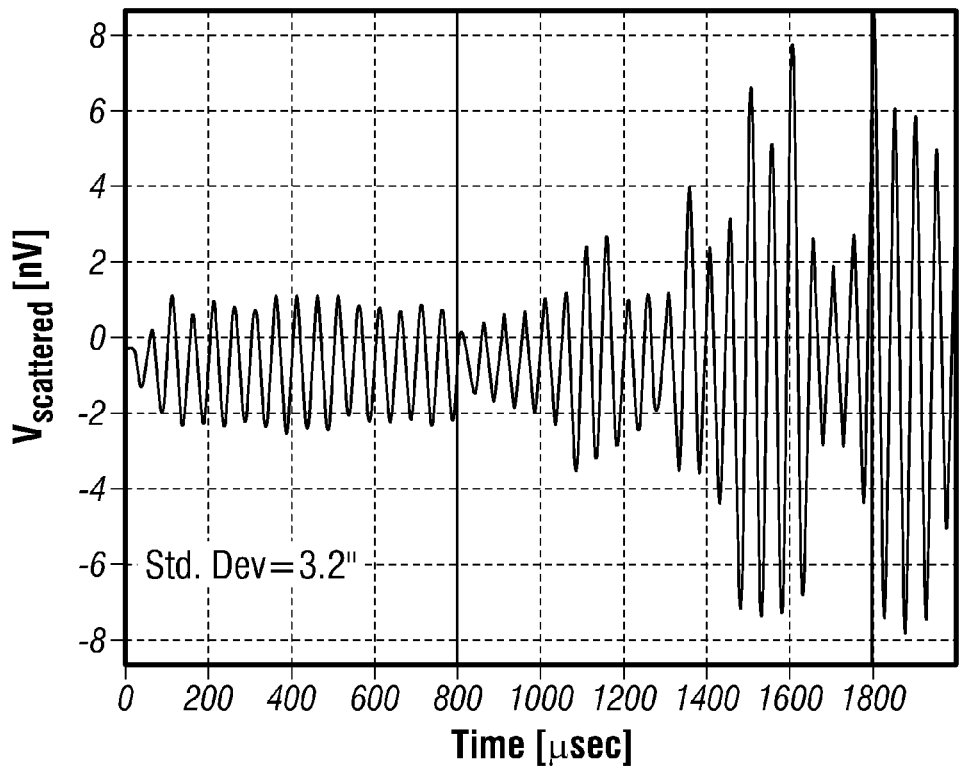
Figure 20C:
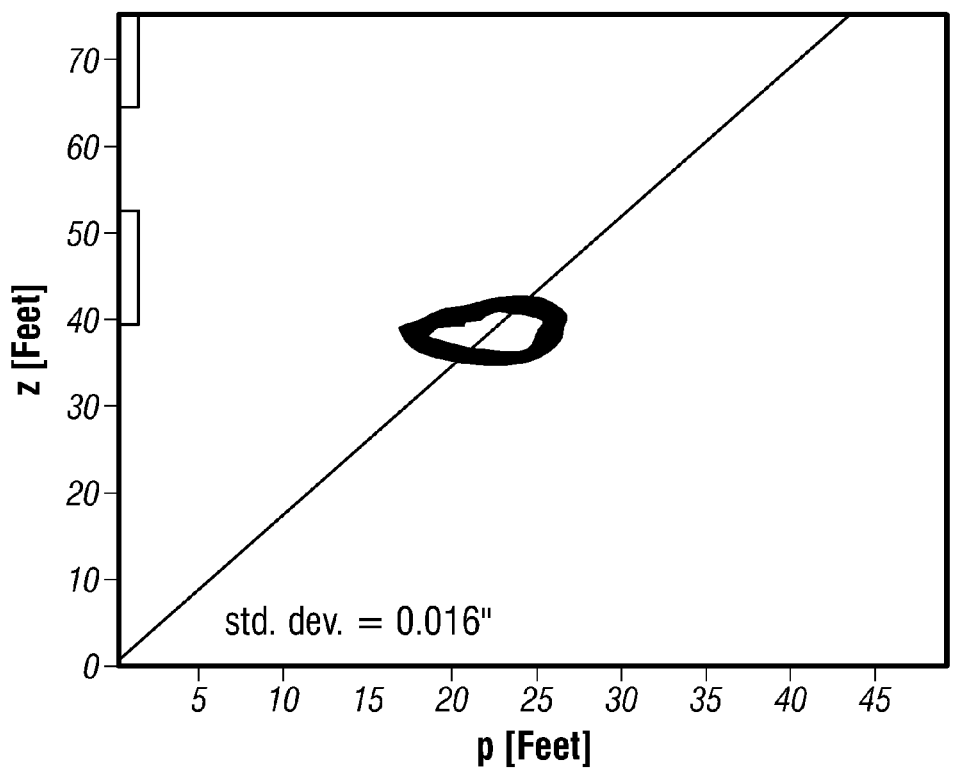
FIGS. 20C-F show the inversion results for different deviations in picking the sampling points.
Figure 20D:
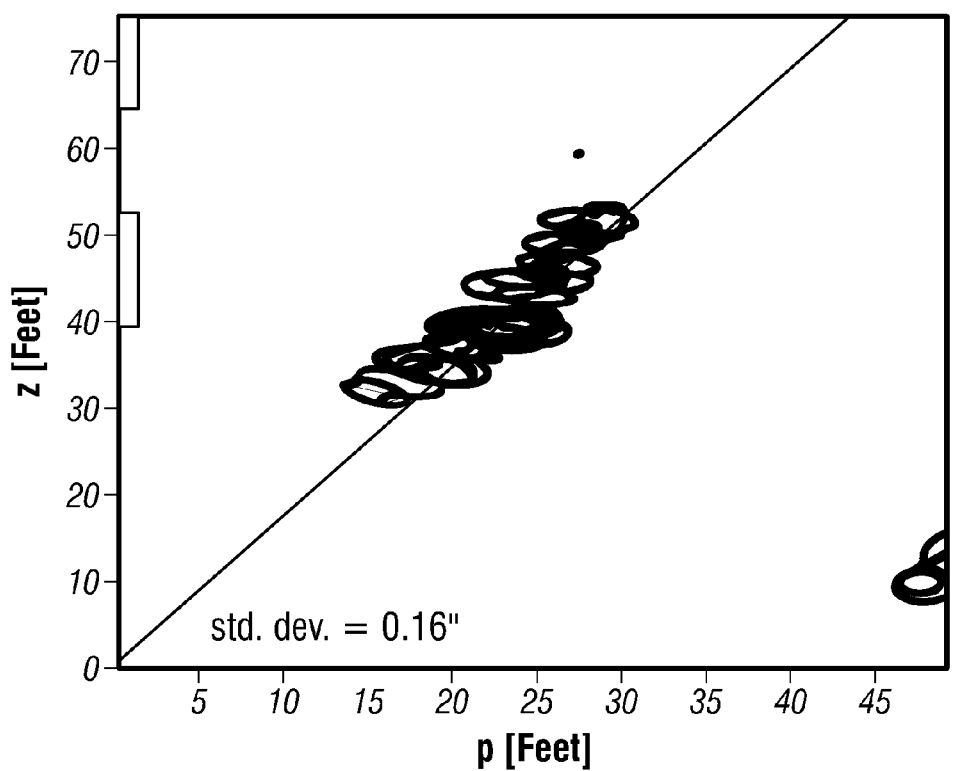
Figure 20E:
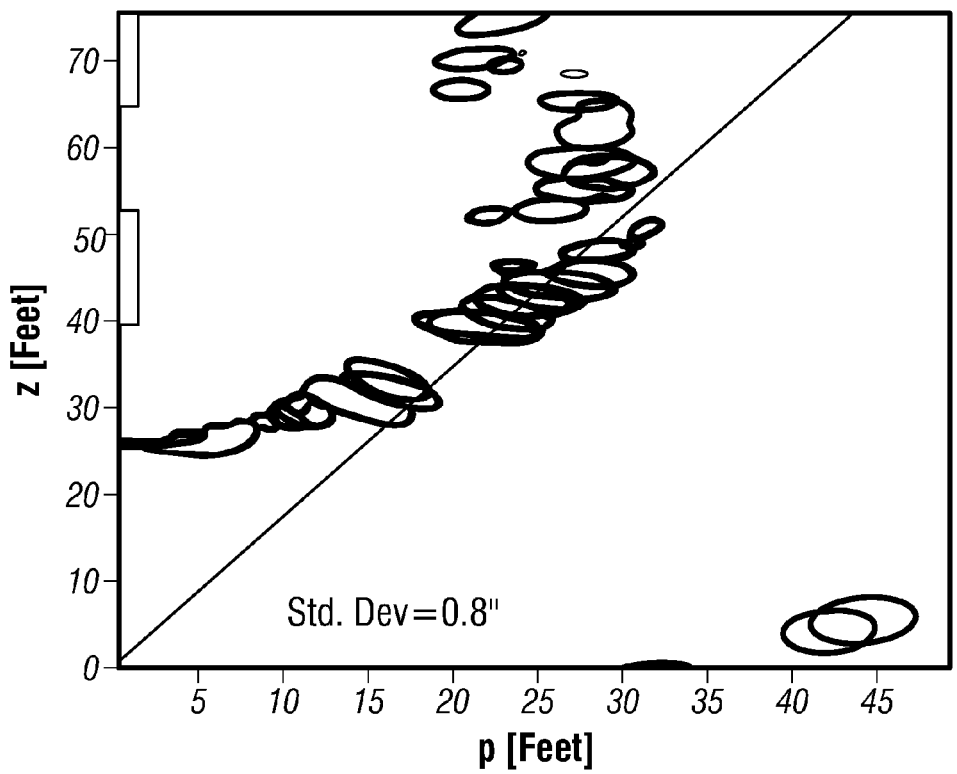
Figure 20F:
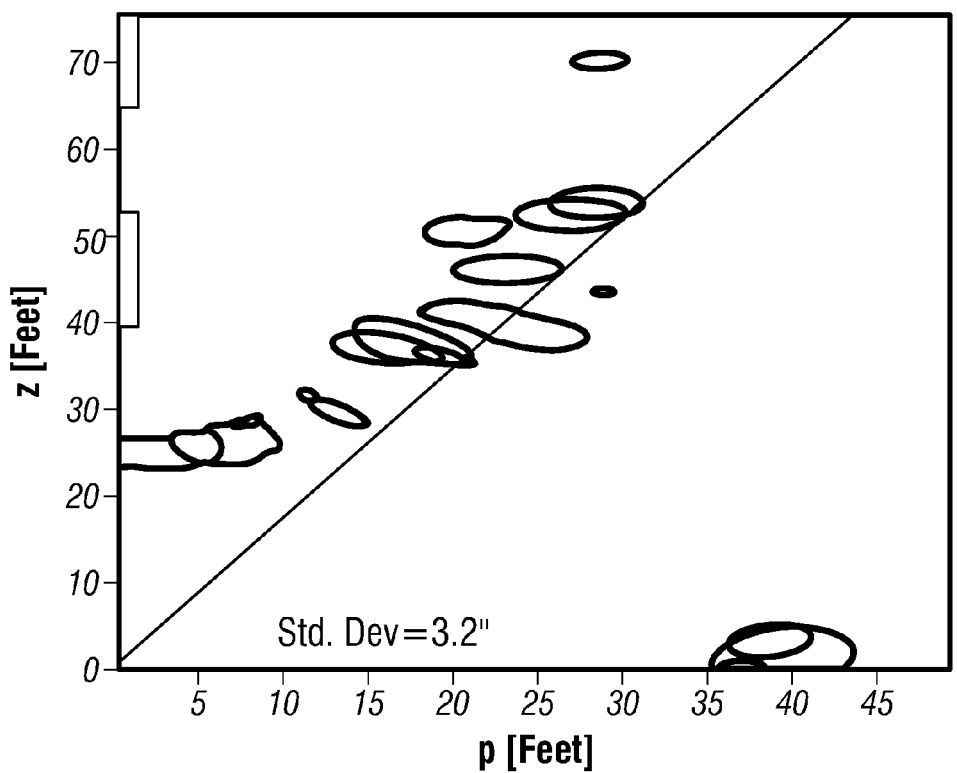
Figure 21A:
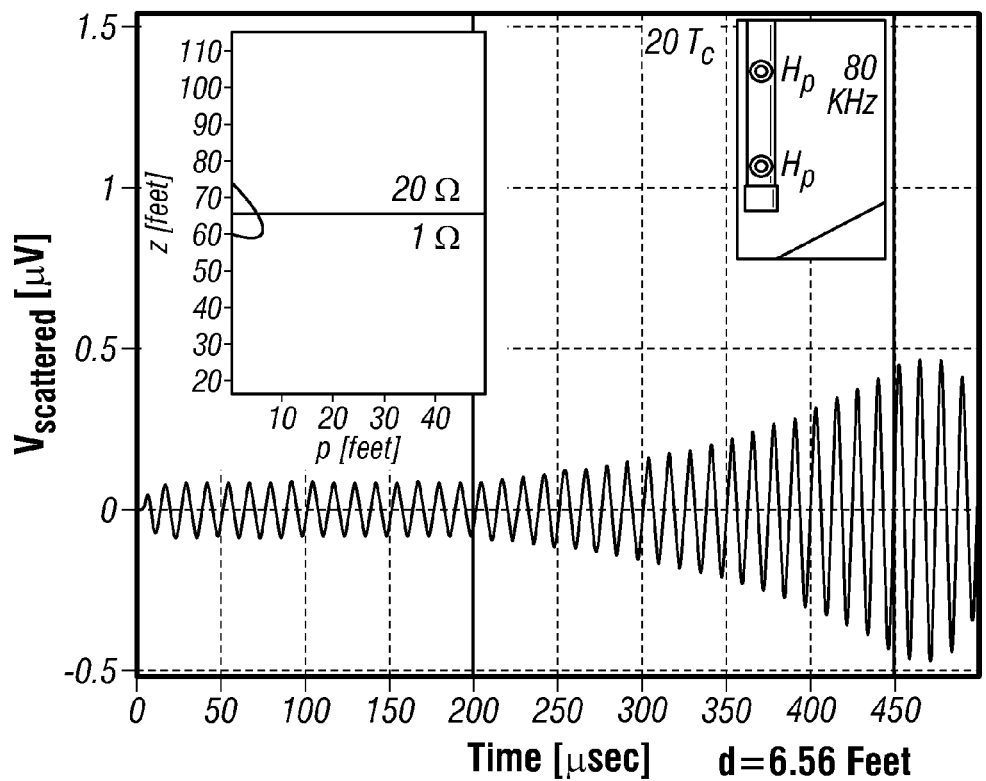
FIGS. 21A-D shows signals received from a formation boundary and inversion results for different distances.
Figure 21B:
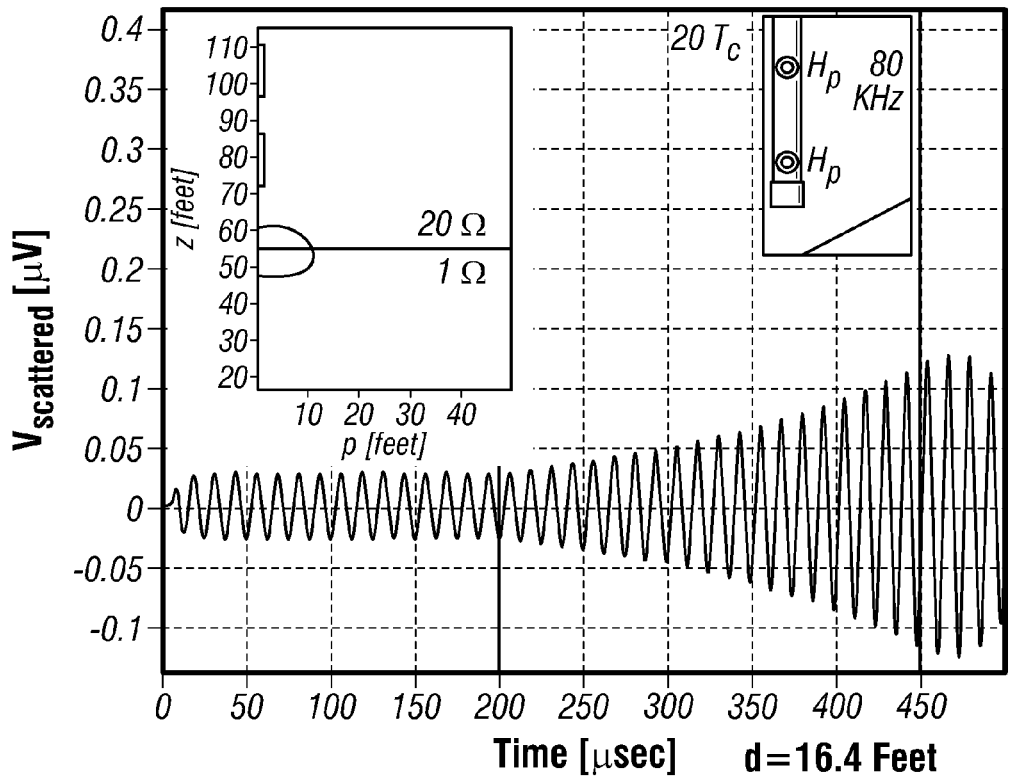
Figure 21C:
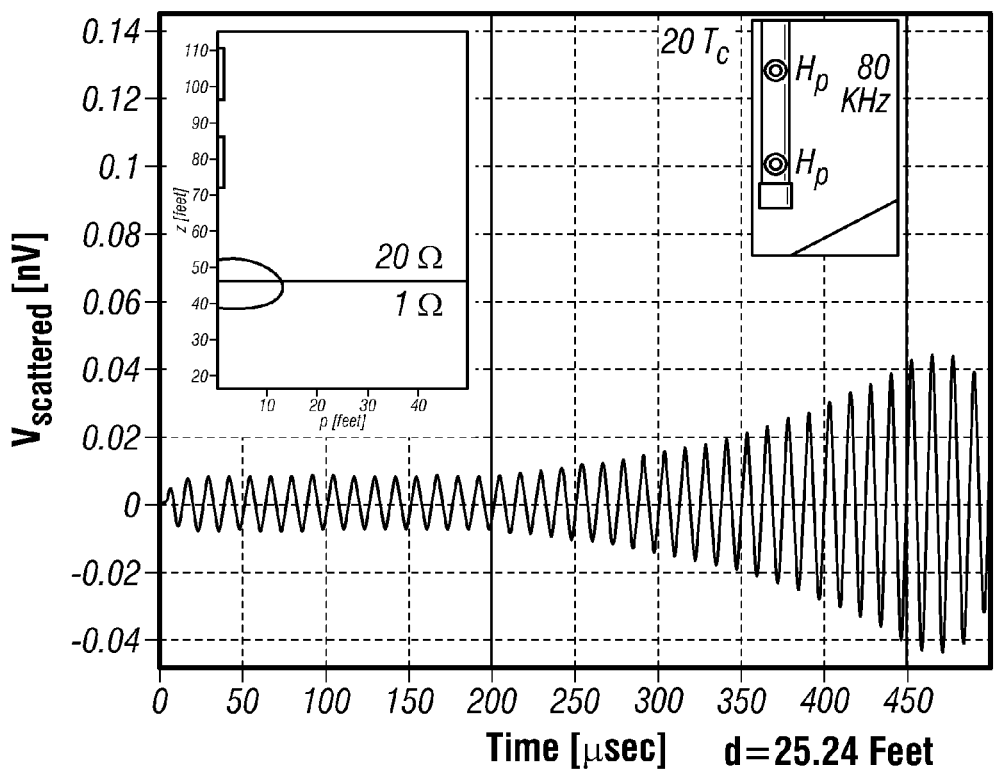
Figure 21D:
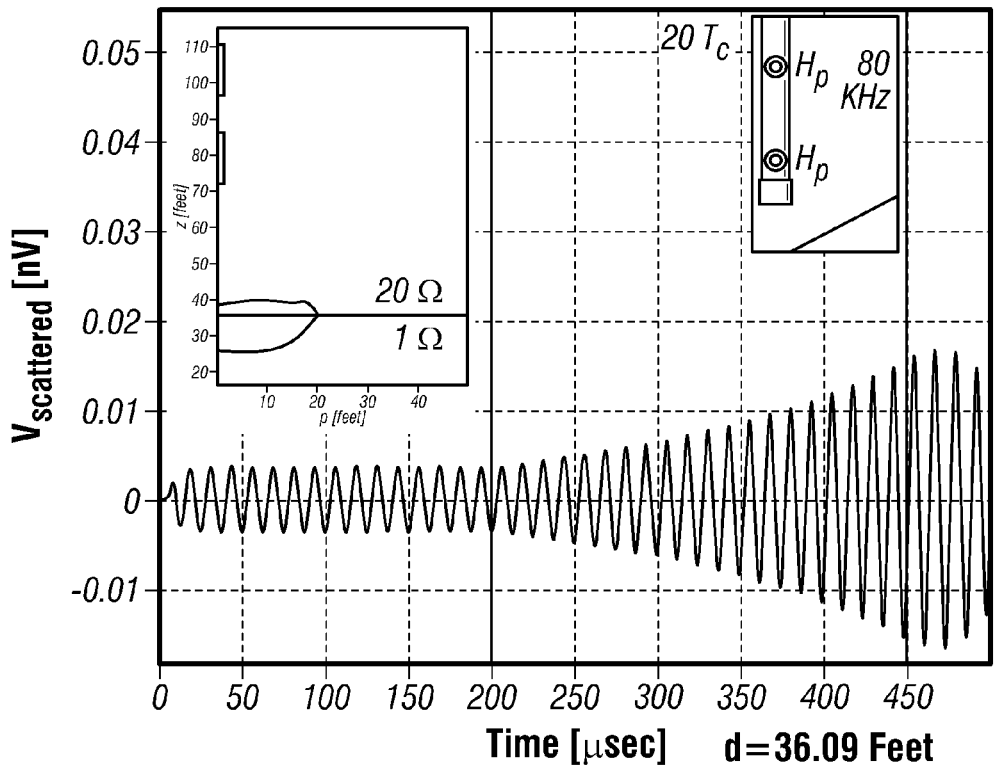

The time processing scheme in FIG. 7 can be used to perform Doppler processing with only a single transmitter and receiver pair. This approach can use sampling of the scattered signal at various depths. Since depth measurement is subject to errors, especially in a hostile borehole environment, the accuracy can be important feature in this sampling process. FIGS. 20A-F show the inversion results for different standard deviations in measurement depth for picking the sampling points. FIGS. 20A-B show signals received from formation boundary with and without deviation in sampling, respectively. Z-directed coil antennas with d=19.69 feet, θ=60°, with a center frequency, $f_c$=20 KHz, can be applied for a 1Ω to 20Ω problem. FIGS. 20C-F show 10 superposed inversion results at different deviation values. The deviation is given by the difference between the locations associated with a uniform reference grid and a deviated grid. A Gaussian random profile is used. FIGS. 20A and 20B show the received signal for uniform sampling and deviated sampling, respectively. FIGS. 20C-F show the inversion results for different deviation levels. It can be seen from FIGS. 20C-F that about 0.1" standard deviation in sampling may be tolerated at maximum.

In various embodiments, a Doppler based tool similar or identical to Doppler based tools discussed herein can make accurate and deep measurements along the tool axis. FIGS. 21A-D shows signals received from a formation boundary and inversion results for different distances. The inversion results are shown in the insets. For a 1Ω to 20Ω problem, ρ-directed coil antennas with a center frequency, $f_c$=80 KHz, can be applied. FIGS. 21A-D show the scattered signal and associated inversion results for a 1Ω to 20Ω case with θ=0°. This ρ-directed coil configuration maximizes the amount of signal that is transmitted in the z-direction and allows for better detection of the formation boundary. Although regular tools would not perform well due to large interfering direct fields, various embodiments of a Doppler tool can separate the signal due to formation boundary from the direct field, since they produce different frequencies. It is seen from FIGS. 21A-D that this configuration can be successfully used to recover distance of a horizontal formation.

In various embodiments, a Doppler based tool similar or identical to Doppler based tools discussed herein can provide background resistivity measurements. Large transmitter-receiver spacing and low frequency excitation allows a Doppler based tool to make deep resistivity measurements. Although this measurement can be used in evaluation purposes, it is also used in distance inversion of anomalies (see FIG. 11). A unique value for resistivity can be obtained by several different methods. A simple configuration to perform this measurement is a single pair of transmitter and receiver, such as those in FIG. 7.

Figure 22A:
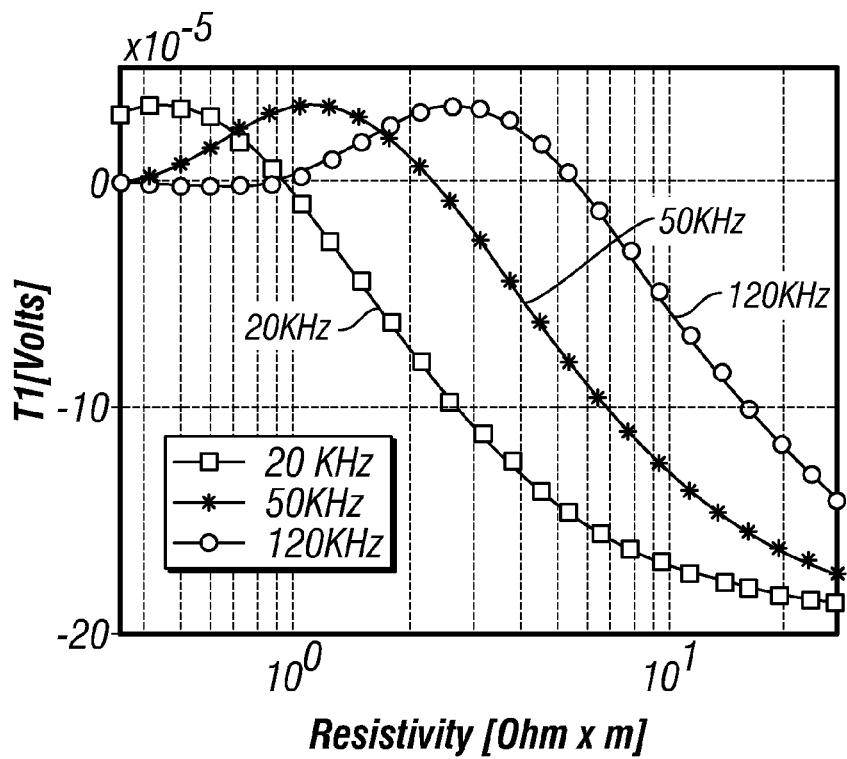
FIGS. 22A-B show received voltage and voltage ratios with respect to resistivity for different frequencies.
Figure 22B:
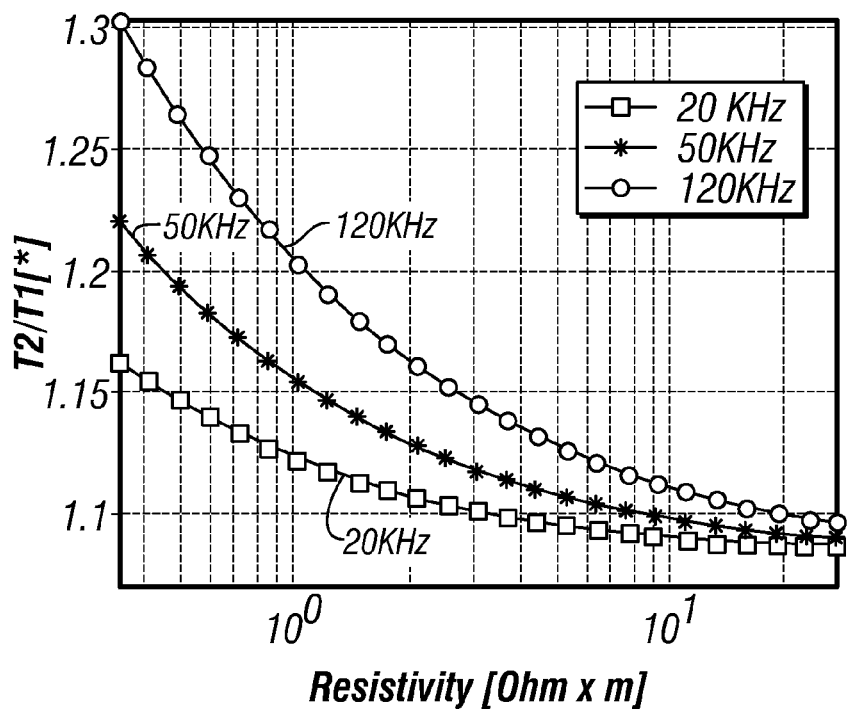

FIGS. 22A-B show received voltage and voltage ratios with respect to resistivity for different frequencies. As shown in FIG. 22A, since a single frequency result is not unique for all possible resistivity values in a practical range, at least two different frequencies are utilized. An alternative methodology is to use the ratio of responses associated with two transmitters and a single receiver at a single frequency. FIG. 22B shows the voltage ratios for transmitter 1 and transmitter 2 excitations at different frequencies. It can be seen from FIGS. 22A-B that unique readings on resistivity can be made in this case even at a single frequency.

In various embodiments, a Doppler based tool similar or identical to Doppler based tools discussed herein can provide superior steering capabilities by deep and detailed reading of formations. It can be determined from FIGS. 19A-F and 20A-F that a Doppler based tool can read at least 20 feet in the radial direction, given electrical noise smaller than 2% and sampling deviation smaller than 0.1". As a result, early steering decisions can be made making the Doppler based tool superior in steering capability.

Resistivity measurement is an important part of well-logging and it has been widely used in the oil industry. Mostly used in combination with other logging methods, resistivity measurements provide important complementary information regarding the amount of fluid in the pores of the rocks and formation type. Since electromagnetic waves offer the deepest penetrations among all other alternatives, it has an important role in evaluation of deep formations and steering.

Conventional induction tools are plagued with a trade-off that dictates either a deep low resolution measurement, or a shallow high resolution measurement. This is mostly due to the fact that signals originating from similar locations differ very slightly in magnitude and phase at low frequencies and get mixed, which manifests itself as a blur effect. In various embodiments, a Doppler methodology, in which different objects produce different frequencies that can then be separated by spectral filtering, can be used to alleviate this problem. A tool that utilizes a novel electromagnetic Doppler strategy, where the observer is moving and the target is stationary can be implemented. By using such a tool, accurate simultaneous inversion of multiple targets can be accomplished, even at low frequencies. Such tools, as compared to conventional tools, can be used for well exploration to provide deeper and more accurate evaluation of formations in all directions, more stable and accurate steering, simultaneous inversion of multiple anomalies, deep reading along the tool axis, background resistivity measurements, superior steering capability, and early prevention of dangerous and expensive situations such as blowouts.

Various components of a Doppler based tool that imitates a moving antenna to locate anomalies downhole in a well, as described herein, can be realized in hardware implementations, software implementations, and combinations of hardware and software implementations. These implementations may include a machine-readable medium having machine-executable instructions, such as a computer-readable medium having computer-executable instructions, for operating the system to excite antennas, collect response signals, and conduct inversion schemes to provide information on targets that provide the response signal. The information can include location and elevation of anomalies downhole. The machine-readable medium can also store parameters used in execution of the instructions and can also store results from execution of the instructions. The form of machine-readable medium is not limited to any one type of machine-readable medium, but can be any machine-readable medium For example, machine-readable medium can include a data storage medium that can be implemented in a housing disposed in a collar of a drill string and/or in a system control center.

Figure 23:
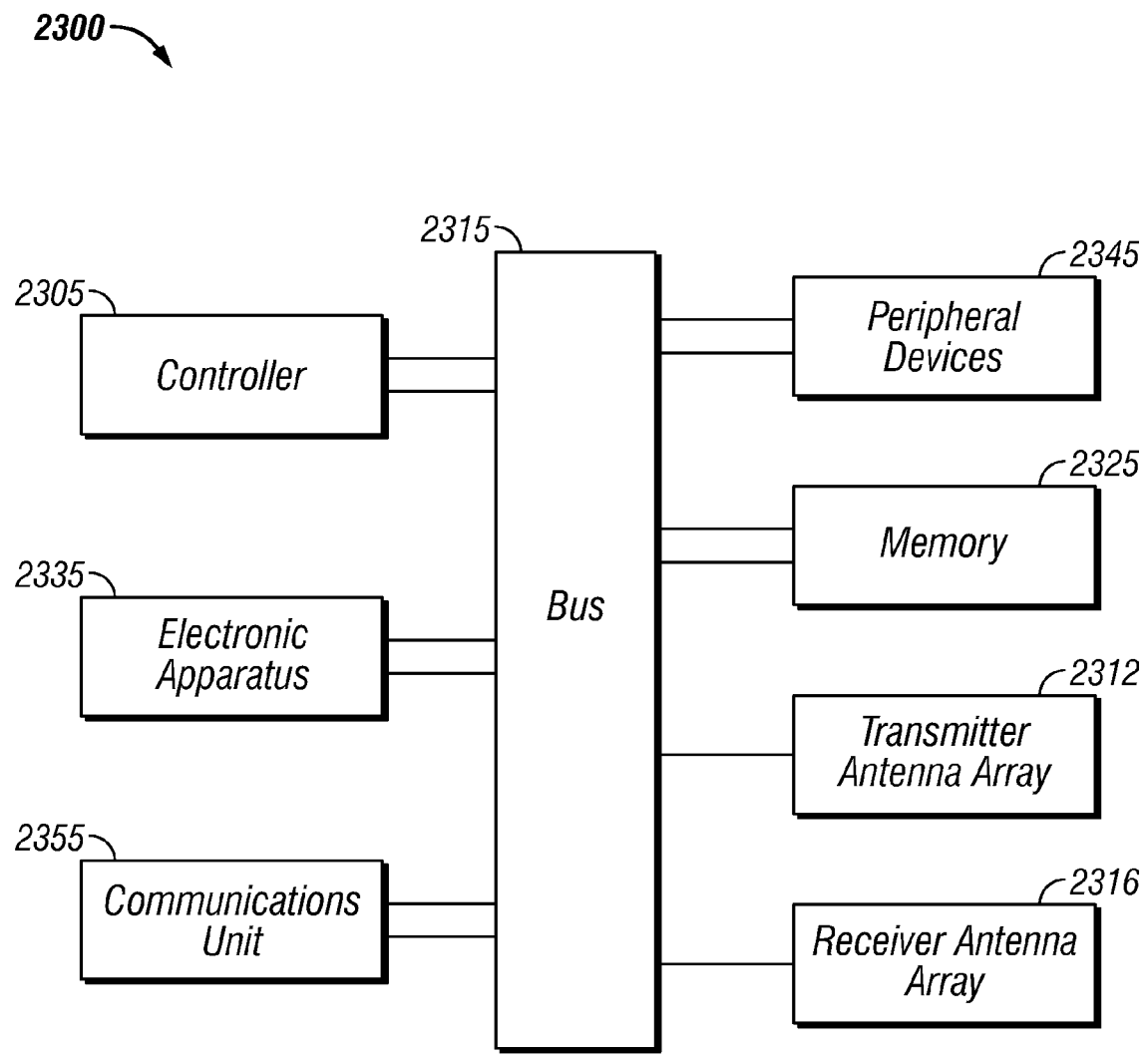
FIG. 23 depicts a block diagram of features of an embodiment of a system having components to use the Doppler effect with respect to a stationary target.

FIG. 23 depicts a block diagram of features of an embodiment of a system 2300 having a controller 2305, a memory 2325, an electronic apparatus 2335, a communications unit 2355, transmitter antenna array 2312, and receiver antenna array 2316. Controller 2305, memory 2325, and communications unit 2355 can be arranged to engage in locating downhole anomalies using the Doppler effect. Electronic apparatus 2335 can include components operable to assist in applying inversion schemes to a processed time signal, from imitating a moving antenna, to obtain information regarding effective targets of the operation of transmitter antenna array 2312 and receiver antenna array 2316. Communications unit 2355 can include downhole communications in a drilling operation. Such downhole communications can include a telemetry system. Antenna array 2312, and receiver antenna array 2316 can be realized in accordance with antennas described herein for implementation in a Doppler based tool.

System 2300 can also include a bus 2315, where bus 2315 provides electrical conductivity among the components of system 2300. Bus 2315 can include an address bus, a data bus, and a control bus, each independently configured. Bus 2315 can also use common conductive lines for providing one or more of address, data, or control, the use of which is regulated by controller 2305. Bus 2315 can be configured such that the components of system 2300 are distributed. Such distribution can be arranged between downhole components and surface components. Alternatively, the components can be co-located such as on one or more collars of a drill string.

In various embodiments, peripheral devices 2345 include displays, additional storage memory, and/or other control devices that may operate in conjunction with controller 2305 and/or memory 2325. In an embodiment, controller 2305 is a processor. A peripheral device arranged as a display can be used with instructions stored in memory 2325 to implement a user interface to manage the operation of a Doppler based tool disposed in system 2300 and distributed among the components of system 2300.

Figure 24:
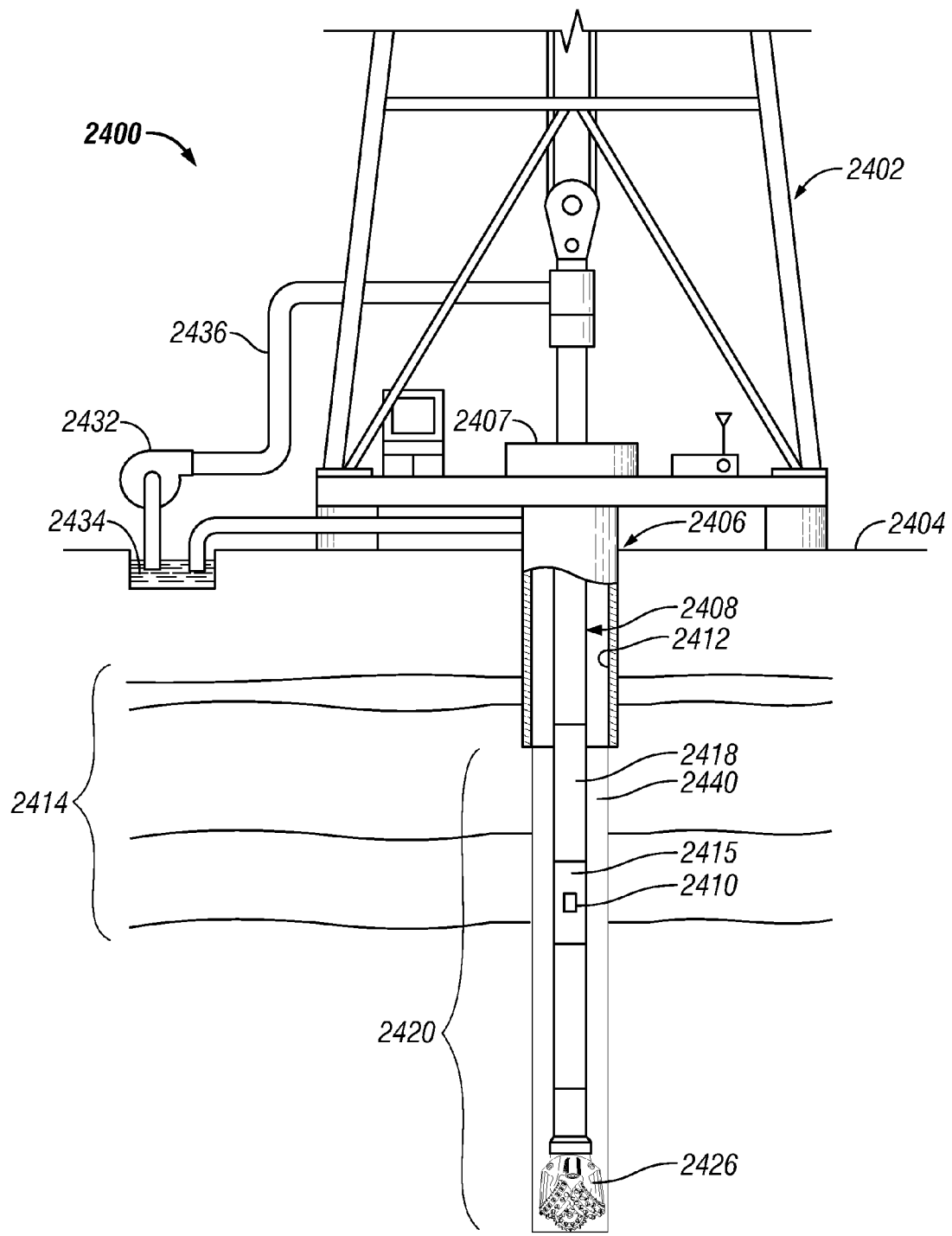
FIG. 24 depicts an embodiment of a system at a drilling site.

FIG. 24 depicts an embodiment of a system 2400 at a drilling site, where system 2400 includes a measurement tool and electronics to determine downhole anomalies using the Doppler effect. System 2400 can include a drilling rig 2402 located at a surface 2404 of a well 2406 and a string of drill pipes, that is drill string 2408, connected together so as to form a drilling string that is lowered through a rotary table 2407 into a wellbore or borehole 2412. The drilling rig 2402 may provide support for drill string 2408. The drill string 2408 may operate to penetrate rotary table 2407 for drilling a borehole 2412 through subsurface formations 2414. The drill string 2408 may include drill pipe 2418 and a bottom hole assembly 2420 located at the lower portion of the drill pipe 2418.

The bottom hole assembly 2420 may include drill collar 2415, transmitter/receiver antenna configuration 2410 attached to drill collar 2415, and a drill bit 2426. Transmitter/receiver antenna configuration 2410 is not limited to attachment to one drill collar 2415, but can be distributed over two or more collars. The drill bit 2426 may operate to create a borehole 2412 by penetrating the surface 2404 and subsurface formations 2414.

During drilling operations, the drill string 2408 may be rotated by the rotary table 2410. In addition to, or alternatively, the bottom hole assembly 2420 may also be rotated by a motor (e.g., a mud motor) that is located downhole. The drill collars 2415 may be used to add weight to the drill bit 2426. The drill collars 2415 also may stiffen the bottom hole assembly 2420 to allow the bottom hole assembly 2420 to transfer the added weight to the drill bit 2426, and in turn, assist the drill bit 2426 in penetrating the surface 2404 and subsurface formations 2414.

During drilling operations, a mud pump 2432 can pump drilling fluid (sometimes known by those of skill in the art as "drilling mud") from a mud pit 2434 through a hose 2436 into the drill pipe 2418 and down to the drill bit 2426. The drilling fluid can flow out from the drill bit 2426 and be returned to the surface 2404 through an annular area 2440 between the drill pipe 2418 and the sides of the borehole 2412. The drilling fluid may then be returned to the mud pit 2434, where such fluid is filtered. In some embodiments, the drilling fluid can be used to cool the drill bit 2426, as well as to provide lubrication for the drill bit 2426 during drilling operations. Additionally, the drilling fluid may be used to remove subsurface formation 2414 cuttings created by operating the drill bit 2426.

Various embodiments of techniques described herein locate downhole anomalies by imitating a moving antenna to use a Doppler effect methodology. Imitating a moving antenna can be realized by electrically driving one or more transmitter antennas using a sequencing of pulses and using a sequencing of pulses to collect responses to the downhole transmission of signals. The collected responses are subjected to an inversion scheme to generate information regarding sources that provide the responses. Such techniques can be utilized in system 2300 and/or system 2400. Such techniques can be utilized to direct steering decisions in a variety of drilling operations.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   controlling transmission of signals downhole in a well by controlling sequencing of pulses from one or more transmitters;
   controlling reception of return signals by controlling timing of data acquisition from one or more receivers, the return signals generated in response to the transmission of the signals, such that the controlled transmission and return signals mimic a moving antenna; and
   determining a characteristic of a geological formation in the well using the Doppler effect, based on the mimicking.

2. The method of claim 1, further comprising:
   applying an inversion scheme to the controlled return signal to identify the presence of an anomaly, based on the mimicking.

3. The method of claim 1, wherein controlling transmission comprises:
applying pulses to different transmitter antennas in an array of transmitter antennas such that the initiation of each pulse to the different transmitter antennas is conducted at different times.

4. The method of claim 1, further comprising:
generating a drive signal to each transmitter antenna of an array of N transmitter antennas, N being a positive integer, to transmit the signals downhole in the well, each drive signal having a waveform signal and a transmission time-based weight signal correlated to an associated transmitter antenna; and
applying a reception time-based weight signal to each return signal from each receiver antenna of an array of M receiver antennas, M being a positive integer, each reception time-based weight signal correlated to an associated receiver antenna.

5. The method of claim 1, further comprising:
exciting at most two transmitter antennas to radiate during a common time interval.

6. The method of claim 1, further comprising:
forming a received time signal based on the return signals, after applying reception time-based weight signals to the return signals;
passing the received time signal though a time gate that selects portions of the received time signal with initial transients substantially removed;
separating at least one of the portions of the received time signal into decaying components or growing components such that one or more frequencies and/or one or more phases are output; and
identifying a different anomaly associated with each of the one or more frequencies and/or one or more phases.

7. The method of claim 6, further comprising:
applying a frequency inversion to the one or more frequencies using a frequency map based on a transmitter antenna excitation scheme; and
identifying a location of the different anomaly by elevation and/or distance, associated with the one or more frequencies.

8. The method of claim 1, further comprising:
determining, based on the return signals, a hydrocarbon source or a water source as an anomaly.

9. A machine-readable storage device that stores instructions, which when performed by a machine, cause the machine to perform operations, the operations comprising:
controlling transmission of signals downhole in a well by controlling sequencing of pulses from one or more transmitters;
controlling reception of return signals by controlling timing of data acquisition from one or more receivers, the return signals generated in response to the transmission of the signals, such that the controlled transmission and return signals mimic a moving antenna; and
determining a characteristic of a geological formation in the well using the Doppler effect, based on the mimicking.

10. The machine-readable storage device of claim 9, wherein controlling the transmission of signals includes applying pulses to different transmitter antennas in an array of transmitter antennas such that the initiation of each pulse to the different transmitter antennas is conducted at different times.

11. The machine-readable storage device of claim 9, wherein the operations comprise:
separating portions of a received time signal formed on the basis of the return signals into decaying components or growing components such that one or more frequencies and/or one or more phases are output;
applying a phase inversion to the one or more phases to identify each different anomaly associated with each of the one or more phases; and
identifying a different anomaly associated with each of the one or more frequencies and/or one or more phases.

12. An apparatus comprising:
a transmitter antenna;
a receiver antenna, the transmitter antenna and receiver antenna disposed on one or more collars attachable to a drill string; and
a system control center configured to control sequencing of pulses from the transmitter antenna and to control timing of data acquisition from the receiver antenna such that the transmitter antenna and the receiver antenna operatively mimic a moving antenna, the apparatus configured to determine a property of a geological formation surrounding a borehole, when the apparatus is used in a borehole, using Doppler effect associated with the mimicked moving antenna a Doppler effect associated with the mimicked moving antenna.

13. The apparatus of claim 12, further comprising:
an array of N transmitter antennas, including the transmitter antenna, that are substantially uniformly spaced apart and/or wherein each antenna of the array has a common configuration selected from a group consisting of a coil, a wire, a toroid, and a button; and
an array of M receiver antennas, including the receiver antenna, wherein each antenna of the array has a common configuration selected from a group consisting of a coil, a wire, a toroid, and a button.

14. An apparatus comprising:
a transmitter antenna;
a receiver antenna, the transmitter antenna and receiver antenna disposed on one or more collars attachable to a drill string, wherein the transmitter antenna and the receiver antenna are arranged to operatively mimic a moving antenna to use a Doppler effect associated with the moving antenna; and
a transmission combining circuit coupled to a digital signal generator to generate a waveform for the transmitter antenna, the transmission combining circuit having one or more input nodes to receive N transmission time-based weight signals and one or more output nodes to output N adjusted transmission signals, each adjusted transmission signal being a product of the waveform and a different one of the associated transmission time-based weight signals.

15. The apparatus of claim 12, wherein the apparatus includes:
a reception combining circuit associated with the receiver antenna, the reception combining circuit having one or more input nodes to receive N reception time-based weight signals and one or more output nodes to output N adjusted reception signals, each adjusted reception signal being a product of a received signal and a different one of the associated reception time-based weight signals.

16. The apparatus of claim 15, wherein the apparatus includes:
a summer coupled to the one or more output nodes of the reception combining circuit, the summer having an output node to output a received time signal representative of the moving antenna.

17. The apparatus of claim 12, wherein the apparatus includes:
a control unit to operatively send a waveform signal, transmission time-based weight signals, and reception time-based weight signals, and to operatively receive a received time signal associated with the moving antenna.

18. The apparatus of claim 12, including a machine-readable storage device that stores instructions, which when performed by the apparatus, cause the apparatus to perform operations, the operations comprising:
generating a drive signal to each transmitter antenna of an array of N transmitter antennas including the transmitter antenna, N being a positive integer, to transmit signals downhole in a well, each drive signal structured as a product of an associated one of transmission time-based weight signals and a waveform signal;
applying an associated one of reception time-based weight signals to each return signal at each receiver antenna of an array of M receiver antennas including the receiver antenna, M being a positive integer;
forming a received time signal based on the return signals, after applying the reception time-based weight signals to the return signals;
passing the received time signal though a time gate that selects portions of the received time signal with initial transients substantially removed;
separating at least one of the portions of the received time signal into decaying components or growing components such that one or more frequencies and/or one or more phases are output; and
identifying a different anomaly associated with each of the one or more frequencies and/or one or more phases.

19. The apparatus of claim 12, wherein the operations comprise:
determining the anomaly as a hydrocarbon source or a water source; and
steering a drilling operation towards the hydrocarbon source or steering a drilling operation away from the water source, based on the determination.

20. The apparatus of claim 12, further comprising:
a down hole tool attached to at least one of the transmitter antenna or the receiver antenna.

* * * * *